United States Patent
Yamagishi et al.

(10) Patent No.: US 7,328,402 B1
(45) Date of Patent: Feb. 5, 2008

(54) CHANGE DETECTION IN A HIERARCHICAL DIRECTORY USING MESSAGES HAVING A FILTERING MASK

(75) Inventors: Yasuaki Yamagishi, Kanagawa (JP); Yoshihisa Gonno, Kanagawa (JP); Fumihiko Nishio, Tokyo (JP); Kazuhiko Takabayashi, Tokyo (JP); Kazuo Haraoka, Kanagawa (JP)

(73) Assignees: Sony Corporation, Tokyo (JP); Information Broadcasting Laboratories, Inc., Tokyo (JP)

( * ) Notice: Subject to any disclaimer, the term of this patent is extended or adjusted under 35 U.S.C. 154(b) by 1054 days.

(21) Appl. No.: 09/605,461

(22) Filed: Jun. 28, 2000

(30) Foreign Application Priority Data

Jun. 30, 1999 (JP) ............................... P11-186491

(51) Int. Cl. *G06F 15/00* (2006.01)
(52) U.S. Cl. ..................................... 715/513; 715/514
(58) Field of Classification Search ................ 715/511, 715/513–514; 707/203
See application file for complete search history.

(56) References Cited

U.S. PATENT DOCUMENTS

| | | | | |
|---|---|---|---|---|
| 5,890,177 A | * | 3/1999 | Moody et al. ............... | 715/511 |
| 5,898,836 A | * | 4/1999 | Freivald et al. ............. | 709/218 |
| 5,924,096 A | * | 7/1999 | Draper et al. ................ | 707/10 |
| 5,978,828 A | * | 11/1999 | Greer et al. ................ | 709/224 |
| 6,189,019 B1 | * | 2/2001 | Blumer et al. .............. | 715/513 |
| 6,311,187 B1 | * | 10/2001 | Jeyaraman .................... | 707/10 |
| 6,347,312 B1 | * | 2/2002 | Byrne et al. .................... | 707/3 |
| 6,377,956 B1 | * | 4/2002 | Hsu et al. ................ | 707/104.1 |
| 6,405,219 B2 | * | 6/2002 | Saether et al. .............. | 707/201 |
| 6,546,406 B1 | * | 4/2003 | DeRose et al. ............. | 715/513 |
| 6,654,746 B1 | * | 11/2003 | Wong et al. .................. | 707/10 |
| 6,681,370 B2 | * | 1/2004 | Gounares et al. ........... | 715/513 |
| 6,728,760 B1 | * | 4/2004 | Fairchild et al. ............ | 709/217 |

* cited by examiner

*Primary Examiner*—C B Paula
(74) *Attorney, Agent, or Firm*—Sonnenschein Nath & Rosenthal LLP

(57) ABSTRACT

Transmitting apparatuses, transmitting methods, receiving apparatuses, receiving methods, and transmitting and receiving systems for transmitting and receiving a hierarchical structure of a directory for hierarchically managing locations of contents data is disclosed. The apparatuses, methods and systems manage a hierarchical structure of a directory composed of a container entry and a leaf entry. The container entry contains information of the lower hierarchical level thereof, a leaf entry being located directly below a container entry. The leaf entry does not contain information of the lower hierarchical level thereof.

10 Claims, 21 Drawing Sheets

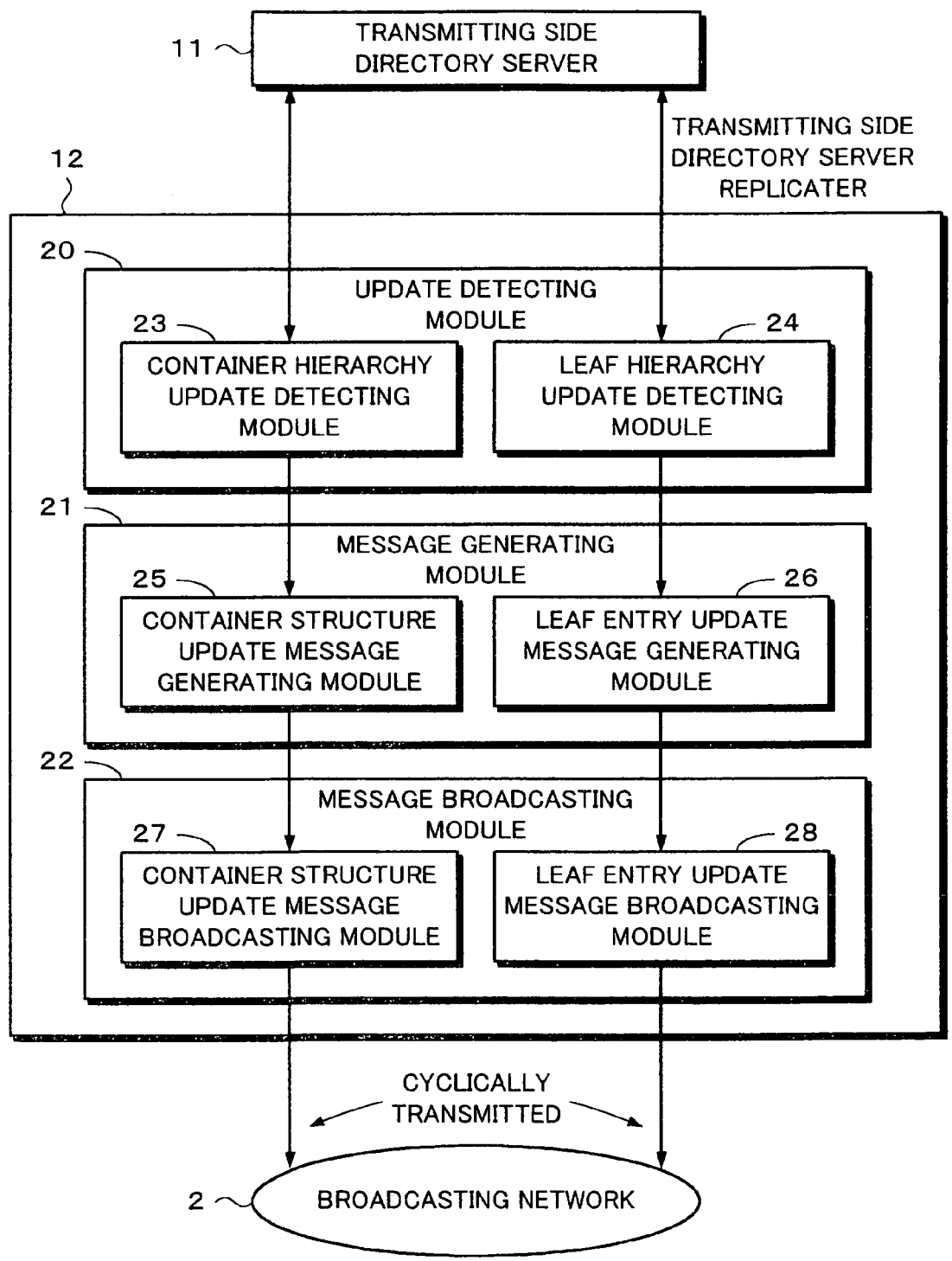

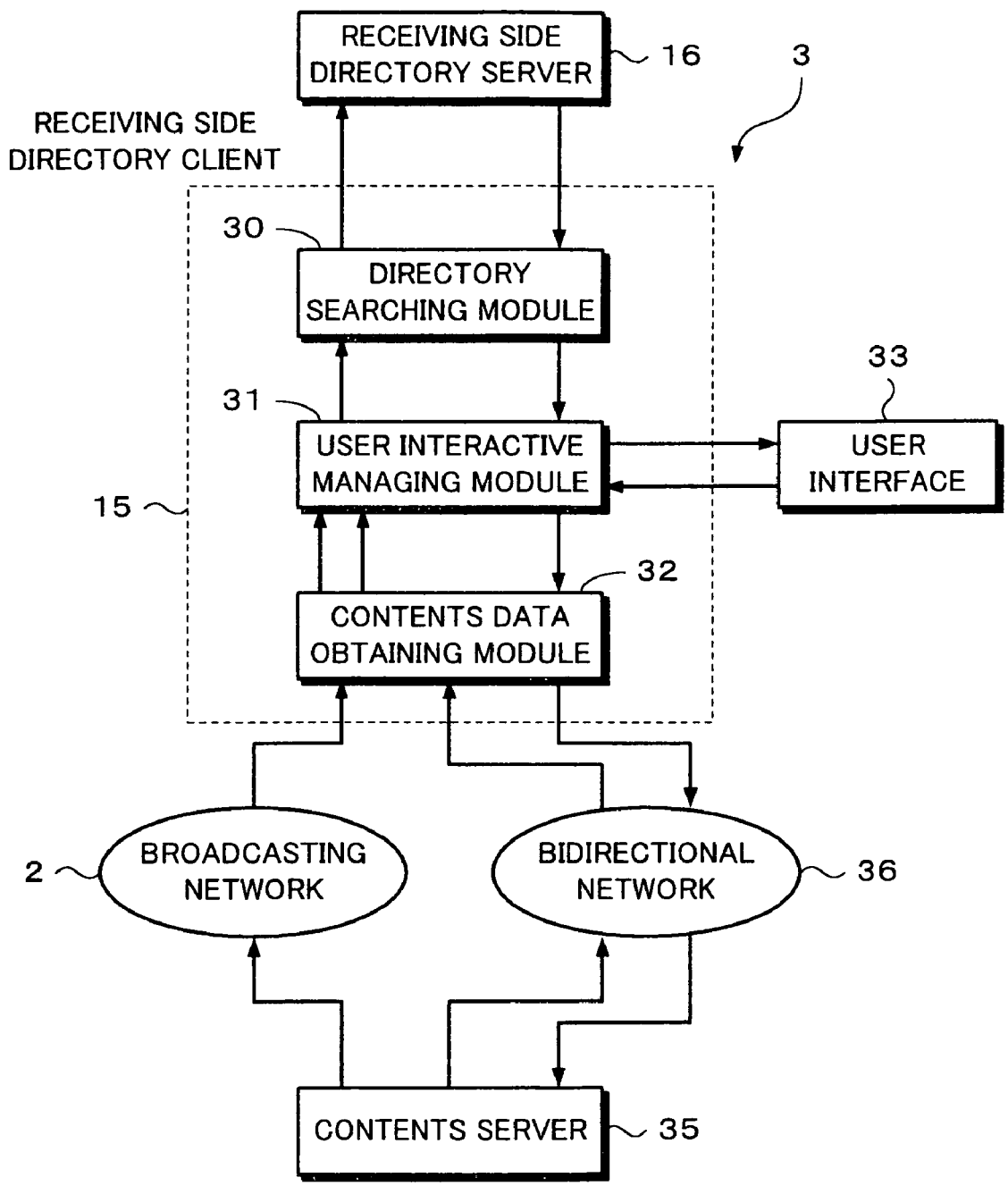

↓ (1,A,+B)

↓ (2,A,+a)

↓ (2,A,−a)

↓ (2,A,−B)

↓ (3,A,+C)

(1,A,+B)
(1,A,+a)

(2,A,−a)
(2,B,+b)

(2,B,+C)
(2,C,+C)

CHANGE DETECTION IN A HIERARCHICAL DIRECTORY USING MESSAGES HAVING A FILTERING MASK

BACKGROUND OF THE INVENTION

1. Field of the Invention

The present invention relates to a transmitting apparatus, a transmitting method, a receiving apparatus, a receiving method, a transmitting and receiving system, and a transmitting and receiving method suitable for uni-directionally delivering hierarchical data that is distributed on a network.

2. Description of the Related Art

Many data delivering methods have been proposed. For example, http (Hyper Text Transfer Protocol) is used to publish pages on the Internet. TCP/IP (Transmission Control Protocol/Internet Protocol) enables computers connected to the Internet to exchange data. In the TCP/IP, a receiving side that receives data calls a transmitting side. Whenever data is transmitted or received corresponding to the TCP/IP, a connection is established between the receiving side and the transmitting side. Thus, with such protocols, data can be delivered with high reliability.

On the other hand, the transmitting side and the network are adversely overloaded and thereby data cannot be effectively delivered. In other words, when the number of terminal units that receive data is becoming large and they access a server that delivers data thereto at a time, the server and the network are adversely overloaded. Thus, even if a terminal unit requests the server for data, the terminal unit cannot receive the requested data from the server in a short time.

To solve such a problem, a method using a satellite line, a CATV (Cable Television) line, a ground wave digital broadcast, and so forth that allows data to be broadcast has been proposed. With this, method, even if the number of terminal units increases, the server and the network are prevented from being adversely overloaded.

In recent years, as digital communication networks such as the Internet have become common, a huge amount of data has been stored on the networks. Thus, it is desired to effectively use such data. To do that, a directory service for hierarchically managing data distributed on a network and providing the data to the user is becoming popular. Using the directory service, the user can quickly find desired information from data distributed on the network and access the desired information.

The directory service has been set forth as X.500 series in OSI (Open System Interconnection) that is an international standard. In the X.500, the directory is defined as a set of open systems. Individual open systems cooperatively have logical databases of information with respect to a set of objects of the real world.

With directory services defined in the X.500, the user can search and browse information stored in the directory. The directory services also provide the user with a list service (such as a telephone directory) and a user authenticating service. In the directory service, each object is assigned a unique name so that the user can easily memorize, infer, and recognize each object.

The directory services defined in the X.500 are very comprehensive. The program size of each directory service is very large. Thus, it is very difficult to accomplish a directory service on the Internet that uses the TCP/IP as a protocol. To solve such a problem, LDAP (Lightweight Directory Access Protocol) has been proposed as a compact type directory service for the TCP/IP.

When the user uses the directory service, he or she can filter the directory. A filtering mask with which the user filters the directory is designated corresponding to the user's tendencies and favorites against the directory. A filtering mask is designated to a particular information genre corresponding to a user's favorite. The user can selectively access directory information to which a filtering mask has been designated. The filtering process allows the user not to keep unnecessary information.

In recent years, a directory service using a broadcast data transmitting means such as a satellite line, a CATV line, a ground digital broadcast, or the like has been proposed. In this case, information is uni-directionally delivered with the directory service. Thus, the user cannot request the directory service for desired data. Consequently, in such a directory service, the same information is repeatedly transmitted.

The user side stores received information to an IRD (Integrated Receiver Decoder) or an STB (Set Top Box) that is a digital broadcast receiver connected to a television receiver. At this point, a filtering process is performed with the above-described filtering mask. Directory information corresponding to a user's favorite is selectively stored. A filtering mask used for the filtering process is designated on the user side.

When the hierarchical structure of the directory changes, the directory server side detects a substantial change of the directory and transmits update information that represents the detected change of the hierarchical structure to the user. At this point, when the user side processes the update information of all the hierarchical structure that has changed, the user side is overloaded. In particular, when the user side uses the STB or IRD, because of their insufficient process capabilities and storage capacities, the user side cannot properly process the update information.

Thus, when the user side processes only a hierarchical structure to which a filtering mask has been designated, the process amount of the user side can be reduced. However, in such a method, when the directory structure is dynamically varied, it will become meaningless to designate a filtering mask. Thus, the user cannot obtain his or her desired information.

OBJECTS AND SUMMARY OF THE INVENTION

Therefore, an object of the present invention is to provide a transmitting apparatus, a transmitting method, a receiving apparatus, a receiving method, a transmitting and receiving system, and a transmitting and receiving method that allow the user side to correspond to a dynamic change of the hierarchical structure of the directory without an increase of the process amount on the user side.

A first aspect of the present invention is a transmitting apparatus for transmitting a hierarchical structure of a directory for hierarchically managing locations of contents data, comprising a managing means for managing a hierarchical structure of a directory composed of a container entry and a leaf entry, a container entry containing information in the immediately lower hierarchical level thereof, a leaf entry being disposed in the immediately lower hierarchical level of a container entry, a leaf entry not containing information in the immediately lower hierarchical level thereof, a detecting means for detecting a change of the hierarchical structure of the directory managed by said managing means and obtaining first difference information and second difference information corresponding to the detected result, the first difference information being the difference of container entries corresponding to the detected result, the second difference information being the difference of leaf entries, and a transmitting means for separately transmitting the first difference information and the second difference information.

A second aspect of the present invention is a transmitting method for transmitting a hierarchical structure of a directory for hierarchically managing locations of contents data, comprising the steps of (a) managing a hierarchical structure of a directory composed of a container entry and a leaf entry, a container entry containing information in the immediately lower hierarchical level thereof, a leaf entry being disposed in the immediately lower hierarchical level of a container entry, a leaf entry not containing information in the immediately lower hierarchical level thereof, (b) detecting a change of the hierarchical structure of the directory managed at step (a) and obtaining first difference information and second difference information corresponding to the detected result, the first difference information being the difference of container entries corresponding to the detected result, the second difference information being the difference of leaf entries, and (c) separately transmitting the first difference information and the second difference information.

A third aspect of the present invention is a receiving apparatus for receiving a hierarchical structure of a directory for hierarchically managing the locations of contents data that is transmitted, comprising a receiving means for receiving first difference information, first identification information, second difference information, and second identification information, the first difference information being obtained by detecting a change of container entries, the first identification information identifying each container entry added to the first difference information, the second difference information being obtained by detecting a change of leaf entries, the second identification information identifying each leaf entry added to the second difference information, the directory being composed of container entries and leaf entries, a container entry containing information in the immediately lower hierarchical level thereof, a leaf entry not containing information in the immediately lower hierarchical level thereof, a managing means for managing the hierarchical structure of the directory formed corresponding to the first difference information and the second difference information, and a changing means for selectively obtaining the second difference information and changing the hierarchical structure of the directory managed by said managing means corresponding to the obtained second difference information.

A fourth aspect of the present invention is a receiving method for receiving a hierarchical structure of a directory for hierarchically managing the locations of contents data that is transmitted, comprising the steps of (a) receiving first difference information, first identification information, second difference information, and second identification information, the first difference information being obtained by detecting a change of container entries, the first identification information identifying each container entry added to the first difference information, the second difference information being obtained by detecting a change of leaf entries, the second identification information identifying each leaf entry added to the second difference information, the directory being composed of container entries and leaf entries, a container entry containing information in the immediately lower hierarchical level thereof, a leaf entry not containing information in the immediately lower hierarchical level thereof, (b) managing the hierarchical structure of the directory formed corresponding to the first difference information and the second difference information, and (c) selectively obtaining the second difference information and changing the hierarchical structure of the directory managed at step (b) corresponding to the obtained second difference information.

A fifth aspect of the present invention is a transmitting and receiving system for transmitting a hierarchical structure of a directory for hierarchically managing locations of contents data and receiving the transmitted hierarchical structure, comprising a first managing means for managing a hierarchical structure of a directory composed of a container entry and a leaf entry, a container entry containing information in the immediately lower hierarchical level thereof, a leaf entry being disposed in the immediately lower hierarchical level of a container entry, a leaf entry not containing information in the immediately lower hierarchical level thereof, a detecting means for detecting a change of the hierarchical structure of the directory managed by said first managing means and obtaining first difference information and second difference information corresponding to the detected result, the first difference information being the difference of container entries corresponding to the detected result, the second difference information being the difference of leaf entries, a transmitting means for adding first identification information to the first difference information and second identification information to the second difference information and separately transmitting the first difference information and the second difference information, the first identification information identifying each container entry, the second identification information identifying each leaf entry, a receiving means for receiving the first difference information, the first identification information, the second difference information, and the second identification information transmitted by said transmitting means, a second managing means for managing the hierarchical structure of the directory formed corresponding to the first difference information and the second difference information, and a changing means for selectively obtaining the second difference information and changing the hierarchical structure of the directory managed by said second managing means corresponding to the obtained second difference information.

A sixth aspect of the present invention is a transmitting and receiving method for transmitting a hierarchical structure of a directory for hierarchically managing locations of contents data and receiving the transmitted hierarchical structure, comprising the steps of (a) managing a hierarchical structure of a directory composed of a container entry and a leaf entry, a container entry containing information in the immediately lower hierarchical level thereof, a leaf entry being disposed in the immediately lower hierarchical level of a container entry, a leaf entry not containing information in the immediately lower hierarchical level thereof, (b) detecting a change of the hierarchical structure of the directory managed at step (a) and obtaining first difference information and second difference information corresponding to the detected result, the first difference information being the difference of container entries corresponding to the detected result, the second difference information being the difference of leaf entries, (c) adding first identification information to the first difference information and second identification information to the second difference information and separately transmitting the first difference information and the second difference information, the first identification information identifying each container entry, the second identification information identifying each leaf entry, (d) receiving the first difference information, the first identification information, the second difference information, and the second identification information transmitted at step (c), (e) managing the hierarchical structure of the directory formed corresponding to the first difference information and the second difference information, and (f) selectively obtaining the second difference information and changing the hierarchical structure of the directory managed at step (e) corresponding to the obtained second difference information.

According to the first and second aspects of the present invention, a hierarchical structure of a directory composed of a container entry and a leaf entry is managed. A container entry contains information in the immediately lower hierarchical level thereof. A leaf entry is disposed in the immediately lower hierarchical level of a container entry. A leaf entry does not contain information in the immediately lower hierarchical level thereof. A change of the hierarchical structure of the directory is detected. First difference information and second difference information are obtained corresponding to the detected result. The first difference information is the difference of container entries. The second difference information is the difference of leaf entries. The first difference information and the second difference information are separately transmitted. Thus, the receiving side can separately process the difference information of container entries and the difference information of leaf entries.

According to the third and fourth aspects of the present invention, first difference information, first identification information, second difference information, and second identification information are received. The first difference information is obtained by detecting a change of container entries. The first identification information identifies each container entry added to the first difference information. The second difference information is obtained by detecting a change of leaf entries. The second identification information identifies each leaf entry added to the second difference information. The directory is composed of container entries and leaf entries. A container entry contains information in the immediately lower hierarchical level thereof. A leaf entry does not contain information in the immediately lower hierarchical level thereof. The hierarchical structure of the directory formed corresponding to the first difference information and the second difference information is managed. The second difference information is selectively obtained. The hierarchical structure of the directory is changed corresponding to the obtained second difference information. Thus, the receiving side can store only the selectively obtained second difference information. As a result, the receiving side does not need to store unnecessary information.

According to the fifth and sixth aspects of the present invention, a hierarchical structure of a directory composed of a container entry and a leaf entry is managed. A container entry contains information in the immediately lower hierarchical level thereof. A leaf entry is disposed in the immediately lower hierarchical level of a container entry. A leaf entry does not contain information in the immediately lower hierarchical level thereof. A change of the hierarchical structure of the directory is detected. First difference information and second difference information are obtained corresponding to the detected result. The first difference information is the difference of container entries. The second difference information is the difference of leaf entries. First identification information is added to the first difference information. Second identification information is added to the second difference information. The first difference information and the second difference information are separately transmitted. The first identification information identifies each container entry. The second identification information identifies each leaf entry. The first difference information, the first identification information, the second difference information, and the second identification information are received. The hierarchical structure of the directory formed corresponding to the first difference information and the second difference information is managed. The second difference information is selectively obtained. The hierarchical structure of the directory is changed corresponding to the obtained second difference information. Thus, the receiving side can separately process the difference information of container entries and the difference information of leaf entries. In addition, the receiving side can store only the selectively obtained second difference information. As a result, the receiving side does not need to store unnecessary information.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 6 is a functional block diagram for explaining the function of a transmitting side replicater;

FIG. 7 is a functional block diagram for explaining the function of a receiving side client;

DETAILED DESCRIPTION OF THE PREFERRED EMBODIMENTS

Figure 1:
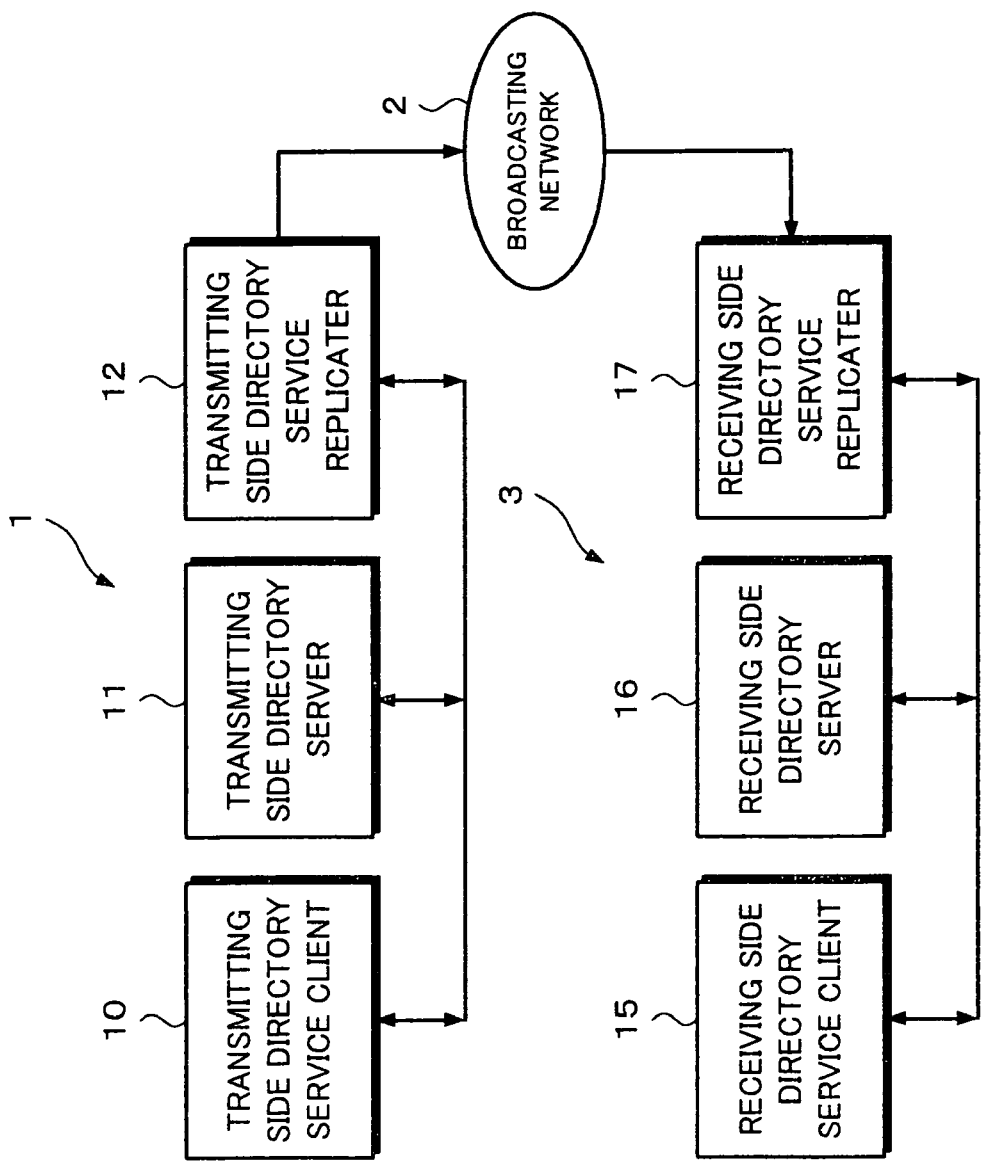
FIG. 1 is a schematic diagram showing a system according to the present invention.
Figure 2:
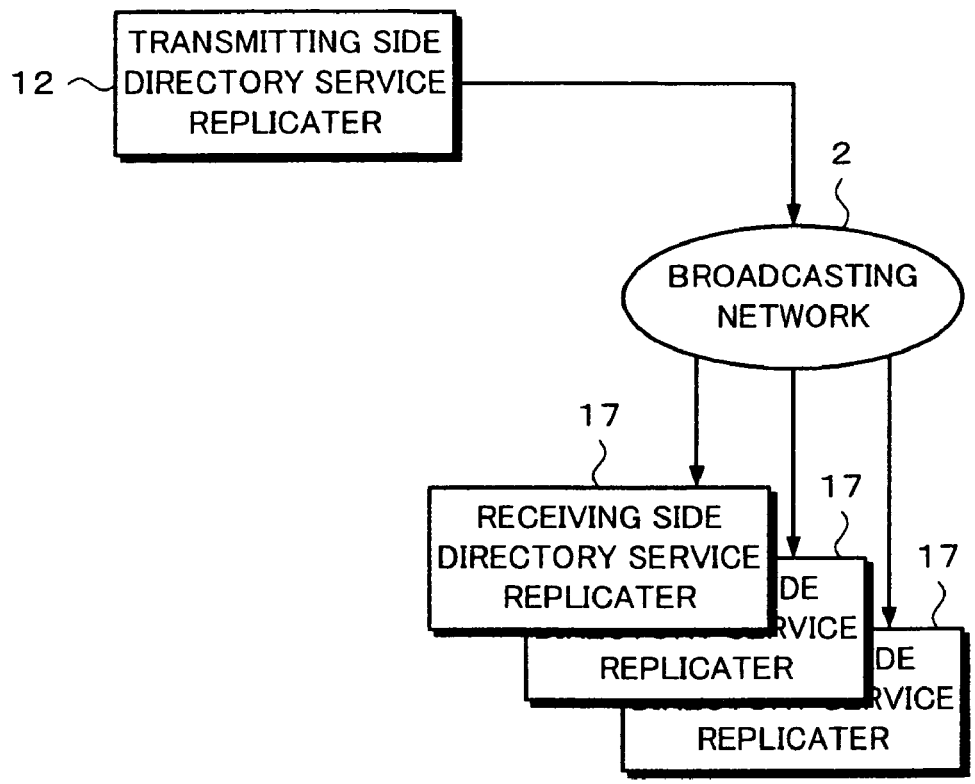
FIG. 2 is a schematic diagram for explaining a system of which a plurality of receiving sides are connected to a broadcasting network.

Next, with reference to the accompanying drawings, an embodiment of the present invention will be described. FIG. 1 shows an example of the structure of a system according to the present invention. A transmitting side 1 arranges many contents data distributed on a network such as the Internet or a broadcast network in a tree shape hierarchical structure and manages it as a directory structure. The transmitting side 1 transmits directory information that represents the directory structure to a broadcasting network 2. As shown in FIG. 2, many receiving devices on the receiving side 3 are connected to the broadcast network 2. The receiving side 3 can receive broadcast programs through the broadcasting network 2. The receiving side 3 receives directory information that is broadcast on the broadcasting network 2. With reference to the received directory information, the receiving side 3 can select required information title from many information titles distributed on the broadcasting network 2 and other networks and obtain the selected information title.

As shown in FIG. 1, the transmitting side 1 comprises a transmitting side directory service client 10 (hereinafter referred to as transmitting side client 10), a transmitting side directory server 11 (hereinafter referred to as transmitting side server 11), and a transmitting side directory server replicater 12 (hereinafter referred to as transmitting side replicater 12). The transmitting side client 10, the transmitting side server 11, and the transmitting side replicater 12 are connected with a network such as the Internet so that they communicate with each other.

The transmitting side client 10 is a contents data provider that provides the user with contents data through a network (not shown). The transmitting side client 10 changes and updates the directory structure. The transmitting side client 10 may be disposed at any location of the network. The transmitting side server 11 inquires and changes the contents of the transmitting side client 10 and manages the directory structure. Many transmitting side servers 11 may be distributed on the network. The transmitting side replicater 12 monitors the directory structure managed by the transmitting side server 11 and detects an update of the directory structure. The transmitting side replicater 12 compares the pre-updated directory structure with the post-updated directory structure corresponding to the detected result, extracts the difference thereof, and generates the difference update information of the directory structure. The difference update information is transmitted to the broadcasting network 2. The structure of the difference update information will be described later.

The receiving side 3 comprises a receiving side directory server replicater 17 (hereinafter referred to as receiving side replicater 17), a receiving side directory server 16 (hereinafter referred to as receiving side server 16), and a receiving side directory service client 15 (hereinafter referred to as receiving side client 15). The receiving side 3 is for example a personal computer, an STB, or an IRD (as were described in the section of "Description of the Related Art"). The receiving side client 15 is for example application software such as WWW (World Wide Web) browser that accesses a directory structure and obtains and displays a plurality of different formats of data. The receiving side server 16 is for example a local database that stores directory information.

The directory information, the update information of the directory structure, and the difference information of the update information that are transmitted through the broadcasting network 2 are received by the receiving side replicater 17. The receiving side replicater 17 updates the local database stored in the receiving side server 16 corresponding to the received information and reforms the directory structure. Corresponding to a user's request or the like, the receiving side client 15 requests the receiving side replicater 17 for desired information. Corresponding to the request, the receiving side replicater 17 searches the database of the receiving side server 16 and returns an address of the required information to the receiving side client 15. Corresponding to the returned address, the receiving side client 15 can access information distributed on the network (not shown).

Figure 3:
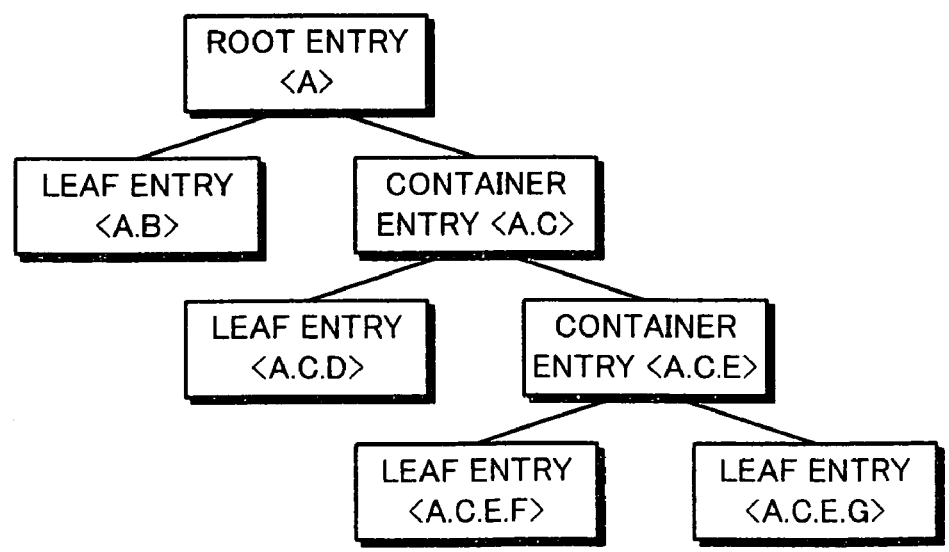
FIG. 3 is a schematic diagram for explaining a directory structure.

Next, with reference to FIG. 3, the directory structure will be described. As shown in FIG. 3, the directory is hierarchically structured in a tree shape. Each node of the tree is referred to as entry. Each entry contains information. There are three types of entries that are one root entry, a plurality of container entries, and a plurality of leaf entries. A container entry can contain an entry in the immediately lower hierarchical level thereof. A hierarchy formed with container entries is hereinafter referred to as container hierarchy.

Entries other than the root entry and container entries are referred to as leaf entries. A leaf entry cannot contain an entry in the immediately lower hierarchical level thereof. Thus, a leaf entry is a terminal node that cannot contain an entry. A hierarchy of a leaf entry is hereinafter referred to leaf hierarchy. A leaf hierarchy is contained in a container entry.

An entry in the highest hierarchical level of the directory tree is referred to as root entry. The root entry represents the entire world of the directory structure. In the following description, it is assumed that a container entry contains at least one leaf entry or at least one container entry.

Each entry has a plurality of attributes. A name that is uniquely identified in the directory tree is referred to as entry name. With an entry name, the location of the entry in the directory structure can be designated. In the example shown in FIG. 3, the root entry is assigned an entry name A. A leaf entry in the immediately lower hierarchical level of the root entry (an entry at the lower left position of the root entry) is assigned an entry name A.B. A container entry in the immediately lower hierarchical level (an entry at the lower right position of the root direction) is assigned an entry name A.C. Each entry is assigned an entry name with periods corresponding to lower hierarchical levels routed from the root entry.

Figure 4:
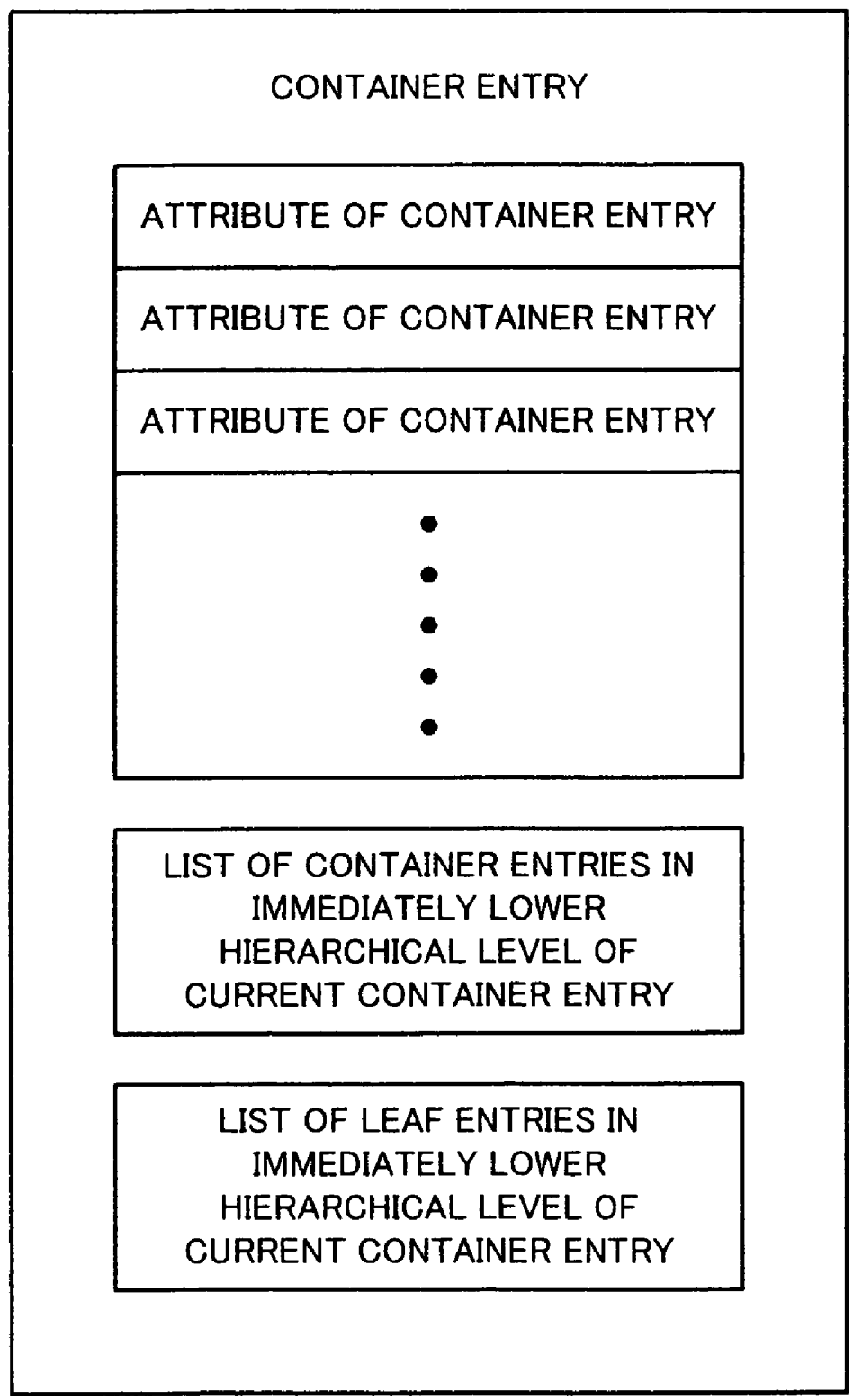
FIG. 4 is a schematic diagram showing an example of the structure of a container entry.

FIG. 4 shows an example of the structure of a container entry. A container entry has attributes thereof, a list of container entries in the immediately lower hierarchical level of the current container entry, and a list of leaf entries in the immediately lower hierarchical level of the current container entry. The list of entries in the immediately lower hierarchical level of the current container entry may not contain elements. The number of attributes of the current container entry may be two or more as shown in FIG. 4.

Figure 5A:
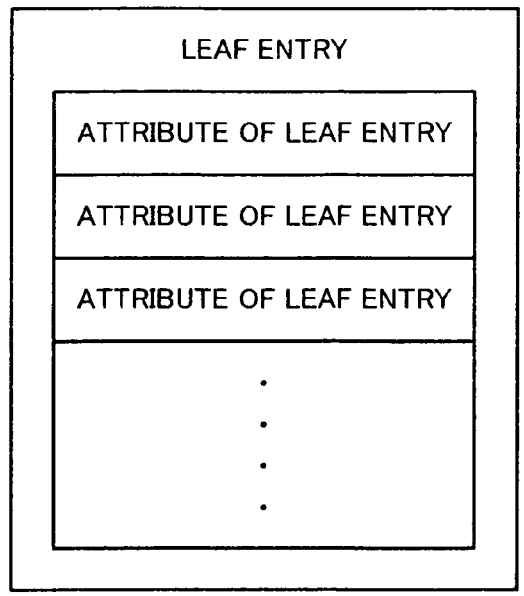
FIGS. 5A and 5B are schematic diagrams showing an example of the structure of a leaf entry.
Figure 5B:
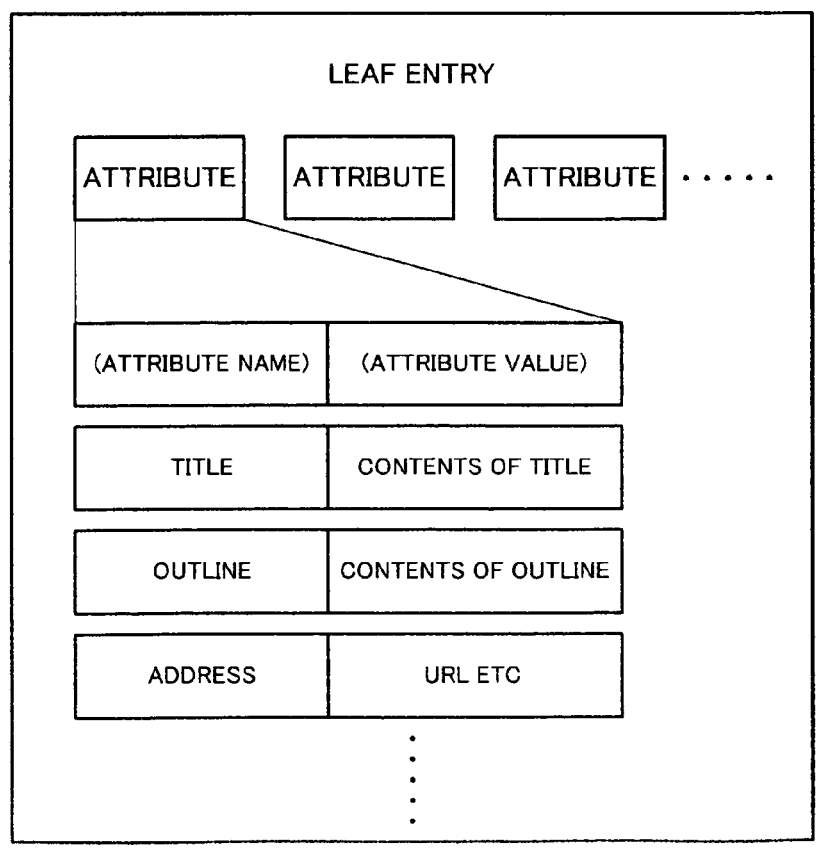

FIGS. 5A and 5B show an example of the structure of a leaf entry. As shown in FIG. 5A, a leaf entry has a plurality of attributes. FIG. 5B shows a real example of attributes of a leaf entry. Each attribute is composed of an attribute name and an attribute value. When a leaf entry is search information of contents data, one attribute name is an address. The attribute value is address information of contents data such as URL (Uniform Resource Locator).

The directory structure has container entries arranged in a tree shape corresponding to information genres under the root entry that represents the entire world.

Next, the structure of the transmitting side 1 will be described in detail. The transmitting side server 11 manages the directory structure as with the structure shown in FIGS. 3, 4, 5A, and 5B. The transmitting side client 10 changes the directory structure managed by the transmitting side server 11 corresponding to contents data that the transmitting side client 10 provides. A change of contents data of the transmitting side server 11 is monitored by the transmitting side replicater 12.

FIG. 6 is a functional block diagram for explaining the function of the transmitting side replicater 12. The transmitting side replicater 12 can be composed of for example a conventional computer system. The transmitting side replicater 12 comprises a CPU (Central Processing Unit), recording and storing mediums (such as a memory and a hard disk), a communicating means, and a user interface. The functional block shown in FIG. 6 is accomplished by application software that runs on the CPU. Each module shown in FIG. 6 is a functional element of the application software.

The transmitting side replicater 12 comprises an update detecting module 20, a message generating module 21, and a message broadcasting module 22. Each of the update detecting module 20, the message generating module 21, and the message broadcasting module 22 has a module that performs a process for a container hierarchy and a module that performs a process for a leaf hierarchy.

The update detecting module 20 is a module that references the transmitting side server 11 and detects whether or not the directory structure managed by the transmitting side server 11 has been changed. The update detecting module 20 is composed of a container hierarchy update detecting module 23 and a leaf hierarchy update detecting module 24. The container hierarchy update detecting module 23 monitors the transmitting side server 11 and detects whether or not the structure of the container hierarchy has been changed. The leaf hierarchy update detecting module 24 monitors the transmitting side server 11 and detects whether the structure of the leaf hierarchy and the contents of the leaf entry have been changed.

The message generating module 21 is a module that generates a message that represents difference update information of the directory structure corresponding to the detected result of the change of the directory structure by the update detecting module 20. The message generating module 21 is composed of a container structure update message generating module 25 and a leaf entry update message generating module 26. The container structure update message generating module 25 generates a message that represents difference update information of the structure change of the container hierarchy corresponding to the detected result of the container hierarchy update detecting module 23. The leaf entry update message generating module 26 generates a message that represents update information of the leaf hierarchy corresponding to the detected result of the leaf hierarchy update detecting module 24.

The message broadcasting module 22 is a module that broadcasts the message generated by the message generating module 21 to the broadcasting network 2. The message broadcasting module 22 is composed of a container structure update message broadcasting module 27 and a leaf entry update message broadcasting module 28. The container structure update message broadcasting module 27 broadcasts the message generated by the container structure update message generating module 25. The leaf entry update message broadcasting module 28 broadcasts the message generated by the leaf entry update message generating module 26. The message broadcasting module 22 cyclically broadcasts the same message to the broadcasting network 2 a predetermined number of times.

Next, the structure of the receiving side 3 will be described in more reality. FIG. 7 is a functional block diagram for explaining the function of the receiving side client 15. The receiving side client 15 can be composed of a conventional computer system. The receiving side client 15 comprises a CPU (Central Processing Unit), recording and storing mediums (such as a memory and a hard disk), a communicating means, and a user interface. The functional block shown in FIG. 7 is accomplished by application software that runs on the CPU. Each module is a functional element of the application software.

As was described above, the receiving side client 15 is for example a WWW browser. The receiving side client 15 can integrally display and reproduce supplied contents data (for example still picture data, text data, audio data, and moving picture data). In addition, corresponding to a user's request that is input with a predetermined inputting means, the receiving side client 15 can control the displaying operation and the reproducing operation of such data.

The receiving side client 15 comprises a directory searching module 30, a user interactive managing module 31, and a contents data obtaining module 32. A user interface 33 is connected to the user interactive managing module 31. The user interface 33 is composed of a text inputting means (such as a keyboard), a pointing device (such as a mouse), and a displaying device. A contents data search request to the receiving side client 15 is interactively performed with the user interactive managing module 31 through the user interface 33.

When a contents data search request is input to the user interactive managing module 31, the user interactive managing module 31 requests the directory searching module 30 for a directory entry corresponding to the desired contents data so as to search the address of the desired contents data. Corresponding to the search request, the directory searching module 30 transmits a directory entry search request to the receiving side server 16.

The search result of the directory entry corresponding to the search request is returned from the receiving side server 16 to the directory searching module 30. The search result is further returned from the directory searching module 30 to the user interactive managing module 31. When the directory entry information of the search result represents that the search result is a leaf entry, the address information of the contents data is extracted as one attribute. The user interactive managing module 31 transmits a contents data obtaining request to the contents data obtaining module 32 so as to obtain contents data corresponding to the extracted address information.

Corresponding to the received contents data obtaining request, the contents data obtaining module 32 transmits a contents data obtaining request to a contents data server 35. The contents data server 35 is a server connected to the receiving side client 15 through a bidirectional network 36 such as the Internet. The contents data server 35 provides the user with contents data. The contents data may be provided through the bidirectional network 36 or the broadcasting network 2.

The contents data obtained from the contents data server 35 corresponding to the contents data obtaining request is supplied to the contents data obtaining module 32 through for example the bidirectional network 36. The contents data is returned from the contents data obtaining module 32 to the user interactive managing module 31. The user interactive managing module 31 outputs the received contents data to the user interface 33.

When the requested contents data is transmitted through the broadcasting network 2, the contents data obtaining module 32 may directly obtain desired contents data that is broadcast through the broadcasting network 2 corresponding to the contents data obtaining request.

Figure 8:
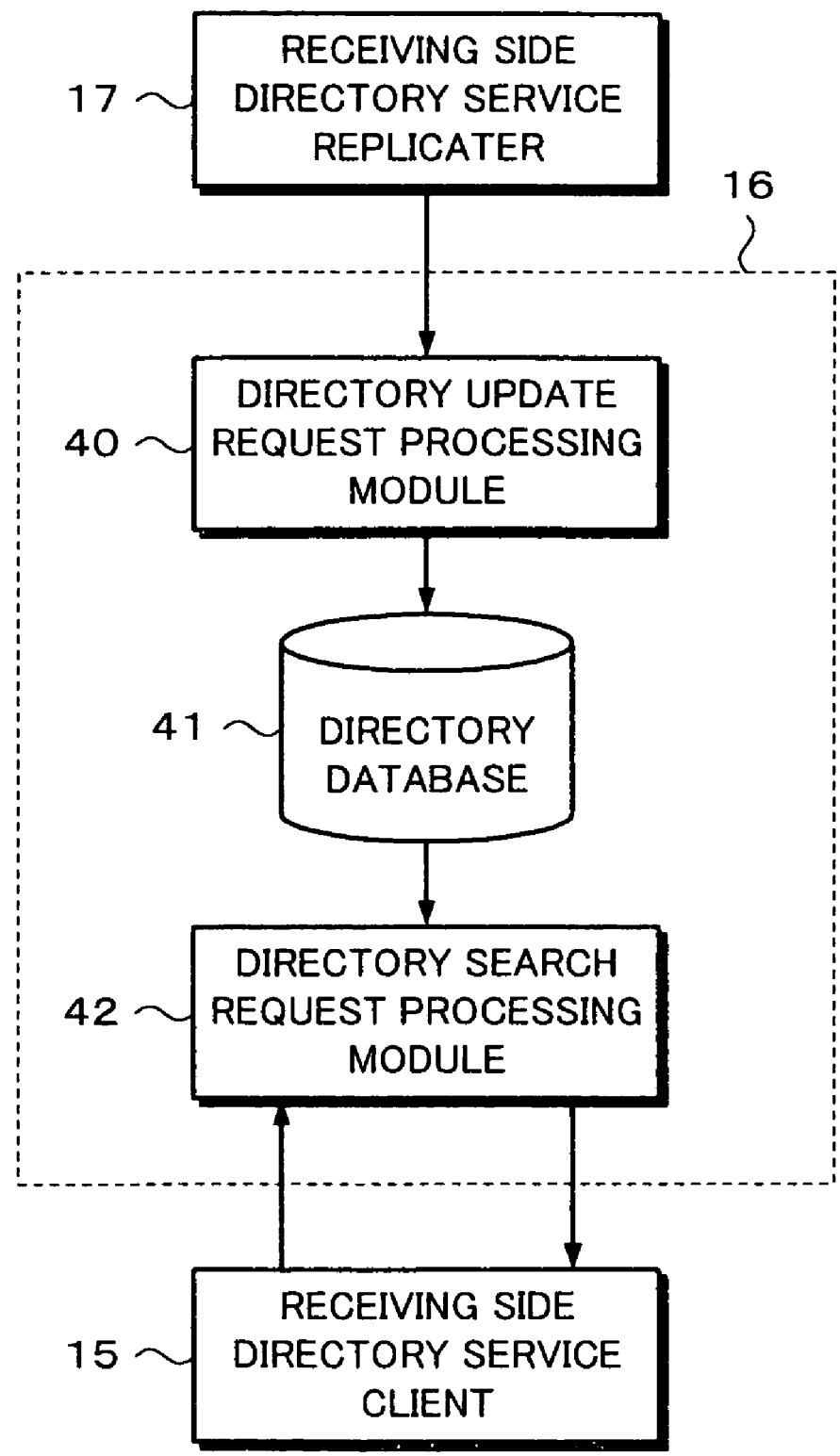
FIG. 8 is a functional block diagram for explaining the function of a receiving side server.

FIG. 8 is a functional block diagram for explaining the function of the receiving side server 16. As with the receiving side client 15, the receiving side server 16 is composed of a conventional computer system. The receiving side server 16 comprises a directory update request processing module 40, a directory database 41, and a directory search request processing module 42.

The directory database 41 stores directory information corresponding to the directory structure managed by the transmitting side server 11. As was described above, the receiving side replicater 17 receives difference update information of the directory structure from the transmitting side 1 through the broadcasting network 2. Although details will be descried later, the receiving side replicater 17 transmits a request to the directory update request processing module 40 so as to update the directory information stored in the directory database 41 corresponding to the difference update information. Corresponding to the request, the directory update request processing module 40 updates the directory information stored in the directory database 41 with the difference update information.

On the other hand, the search request for the directory entry transmitted from the receiving side client 15 is received by the directory search request processing module 42. The directory search request processing module 42 searches the directory database 41 for the required directory entry corresponding to the received search request. The directory entry as the search result (for example, address information of a leaf entry) is returned from the directory search request processing module 42 to the receiving side client 15.

Since the system is structured as described above, the user can search directory information with the receiving side client 15 and obtain address information with desired contents data as the search result. The user can obtain desired contents data corresponding to the obtained address information. The directory structure is monitored by the transmitting side replicater 12. The difference update information and the overall structure information of the directory structure are transmitted at intervals of a predetermined time period and supplied to the receiving side replicater 17 through the broadcasting network 2. Corresponding to the supplied difference update information and overall structure information, the receiving side replicater 17 on the user side updates the directory information stored in the directory database 41. Thus, the user can always have directory information that synchronizes with a real directory structure in the directory database 41.

Next, with reference to FIGS. 9A, 9B, 9C, 9D, 9E, 9F, 10A, 10B, 10C and 10D, the difference update information and the overall structure information of the directory structure will be described. In the following description, a process for adding or deleting a container entry C or a leaf entry 1 to/from the immediately lower hierarchical level of a container entry X of a particular container hierarchy designated by a schema version Sv is expressed as follows.

(Sv,X,[+/−][C/1])

The expression of the process for the directory structure represents the difference between the pre-processed directory structure and the post-processed directory structure. The expression can be used as difference update information.

The schema version Sv is a value that changes corresponding to the change of the directory structure. The container entry X (or C) is a container entry name. In this example, a container entry name is represented by a uppercase alphabet character. The leaf entry 1 represents a leaf entry name. In this example, a leaf entry name is represented by a lowercase alphabet character. An addition of an entry is represented by [+]. A deletion of an entry is represented by [−]. A slash mark in parentheses [ ] represents that one of two characters therein is placed. In FIGS. 9A to 9F and 10A to 10D, a concentric square represents a container entry, whereas a single square represents a leaf entry. In FIGS. 9A to 9F and 10A to 10D, the root entry is not shown except for a connection line thereof.

Figure 9A:
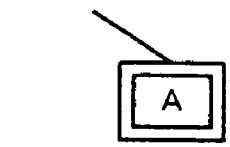
FIGS. 9A, 9B, 9C, 9D, 9E, and 9F are schematic diagrams for explaining difference update information of a directory structure.
Figure 9B:
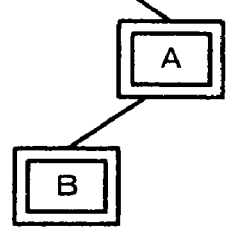

FIG. 9A shows only a container entry A is disposed in the immediately lower hierarchical level of the root entry (not shown). This state is referred to as schema version Sv=1. In this state, a process of (1, A, +B) is performed. In other words, a container entry B is added to the immediately lower hierarchical level of the container entry A. Thus, a directory structure as shown in FIG. 9B is generated. Since the container entry B is added to the state shown in FIG. 9A, since a hierarchical image of the container entries is changed, the schema version is changed to Sv=2.

Figure 9C:
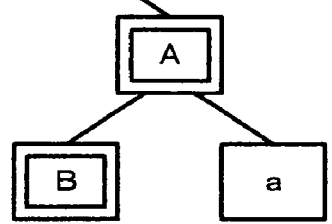
Figure 9D:
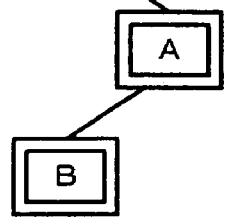

In the state shown in FIG. 9B, a process of (2, A, +a) is performed. In other words, a leaf entry a is added to the immediately lower hierarchical level of the container entry A. Thus, a directory structure shown in FIG. 9C is generated. In addition, a process of (2, A, −a) is performed in the state shown in FIG. 9C. In other words, the leaf entry a is deleted from the immediately lower hierarchical level of the container entry A. Thus, a directory structure as shown in FIG. 9D is generated. Thereafter, a process of (2, A, −B) is performed in the state shown in FIG. 9D. In other words, the container entry B is deleted from the immediately lower hierarchical level of the container entry A. Thus, a directory structure shown in FIG. 9E is generated.

Figure 9E:
Figure 9F:
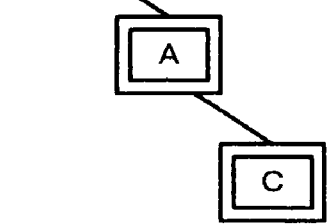

In the state shown in FIG. 9E, since the hierarchical image of the container entry has been changed from the state shown in FIG. 9D, the schema version Sv is updated. Thus, the schema version is changed to Sv=3. Consequently, in the state shown in FIG. 9E, a process for adding a container entry C to the immediately lower hierarchical level of the container entry A is expressed by (3, A, +C). When this process is performed, a directory structure shown in FIG. 9F is generated.

In the example shown in FIGS. 9A to 9F, (1, A, +B), (2, A, +a), (2, A, −a), (2, A, −B), and (3, A, +C) are difference update information in individual states.

Figure 10A:
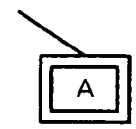
FIGS. 10A, 10B, 10C, and 10D are schematic diagrams for explaining difference update information of a directory structure.
Figure 10B:
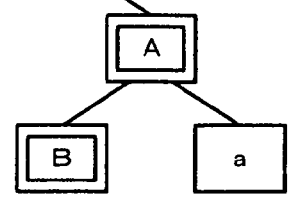

FIGS. 10A, 10B, 10C, and 10D show another example of which a directory structure is changed. In the example shown in FIGS. 9A to 9F, one process is performed at a time. However, in FIGS. 10A to 10D, two processes are performed at a time. FIG. 10A shows only a container entry A is disposed in the immediately lower hierarchical level of the root entry (not shown). This state is referred to as schema version Sv=1. In the state shown in FIG. 10A, processes of (1,0 A, +B) and (1, A, +a) are successively performed. In other words, a container entry B and a leaf entry a are added in the immediately lower hierarchical level of the container entry A. Thus, a directory structure shown in FIG. 10B is generated. In this state, the hierarchical image of the container entries is changed. Thus, the schema version is changed to Sv=2.

In the state shown in FIG. 10B, two processes of (2, A, −a) and (2, B, +b) are successively performed. In other words, a leaf entry a is deleted from the immediately lower hierarchical level of the container entry A. Thereafter, a leaf entry b is added to the immediately lower hierarchical level of the container entry B. Thus, a directory structure shown in FIG. 10C is generated.

Figure 10C:
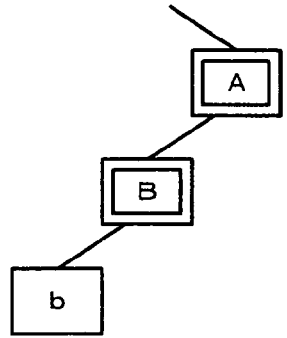
Figure 10D:
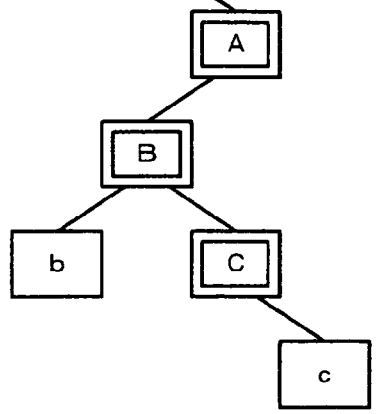

In the state shown in FIG. 10C, two processes of (2, B, +C) and (2, C, +c) are performed. In other words, a container entry C is added to the immediately lower hierarchical level of the container entry B. Thereafter, a leaf entry c is added to the immediately lower hierarchical level of the container entry C. In this case, since a leaf entry is added to an added container entry, the order of the processes cannot be changed. Thereafter, a directory structure shown in FIG. 10D is generated. Since the hierarchical image of the container entry is changed, the schema version Sv is updated. Thus, the schema version is changed to Sv=3.

In the example shown in FIGS. 10A to 10D, (1, A, +B) and (1, A, +a), (2, A, −a) and (2, B, +b), and (2, B, +C) and (2, C, +c) are difference update information in individual stages. As was described above, when a plurality of processes are performed as one updating process of a directory structure, the order of processes should be considered.

The difference update information and the overall structure information of the directory structure are not limited to the above-described examples. Instead, they may be changed corresponding to the applied system.

The contents of a leaf entry may be modified along with a deletion and an addition thereof from/to the immediately lower hierarchical level of a container entry. When the contents of a leaf entry are modified, the directory structure is not changed. In this case, difference update information is generated with for example a leaf entry name and a sequence of attribute names and attribute values that were modified. In this case, the difference update information is expressed as follow.

{
LeafEntryName,
Set of {AttributeName, AttributeValue}
}

In the system according to the present invention, as was described above, difference update information and overall structure information are uni-directionally transmitted from the transmitting side 1 to the receiving side 3 through the broadcasting network 2. In addition, there are many receiving devices on the receiving side 3 against one transmitting side 1. In addition, the operating states of the individual receiving devices on the receiving side 3 differ. Thus, it is necessary to synchronize directory information managed on the transmitting side 1 with directory information managed on the receiving side 3.

Next, a method for synchronizing directory information stored in the transmitting side server 11 on the transmitting side 1 with directory information stored in the receiving side server 16 on the receiving side 3 and managing the synchronization of the directory structure will be described.

Figure 11:
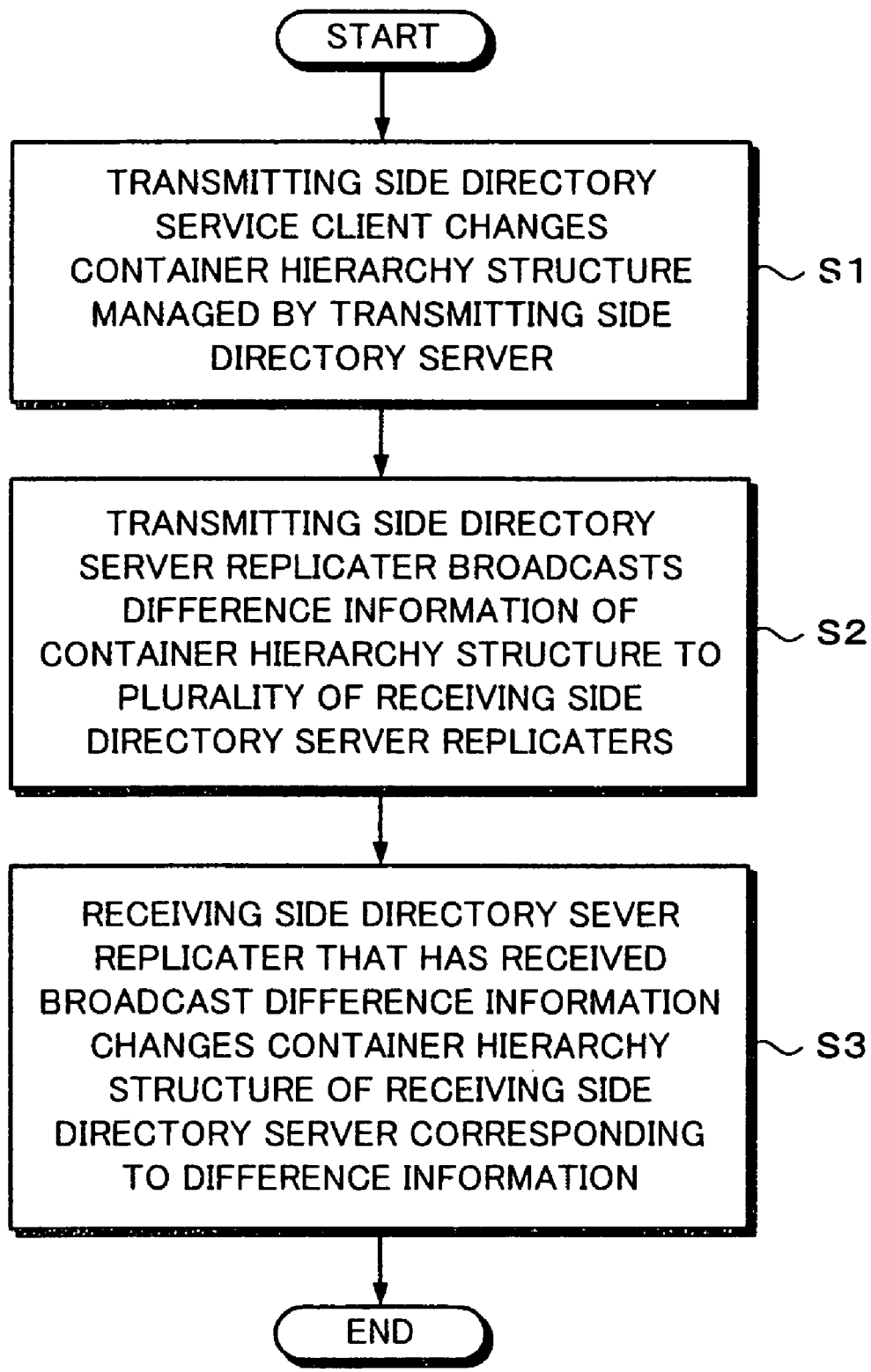
FIG. 11 is a flow chart for explaining a synchronization managing method of container entries.

First, with reference to FIG. 11, a method for managing the synchronization of container entries will be described. At step S1, the transmitting side client 10 changes the structure of the container hierarchy of a directory structure managed by the transmitting side server 11. For example, the transmitting side client 10 performs a process for adding a new container entry and/or a leaf entry to the immediately lower hierarchical level of a particular container entry and a process for deleting a container entry and/or a leaf entry from the immediately lower hierarchical level of a particular container entry.

At step S2, the transmitting side replicater 12 detects a change performed in the transmitting side server 11. Corresponding to the detected result, the transmitting side replicater 12 generates container structure update information Msg.1 corresponding to the change of the container hierarchical structure. The generated container structure update information Msg.1 is broadcast to the broadcasting network 2. The same contents of the container structure update information Msg.1 are cyclically broadcast a predetermined number of times.

At step S3, the container structure update information Msg.1 that has been broadcast is received by the receiving side replicater 17. The receiving side replicater 17 changes the container hierarchy structure managed with directory information stored in the receiving side server 16 corresponding to the received container structure update information Msg.1. Thus, the structure of the container hierarchy of the directory information on the transmitting side 1 is synchronized with that on the receiving side 3.

The format of the container structure update information Msg.1 is expressed as follows.

Container Structure Update Message {
MessageID,
Difference update information
}

"MessageID" is identification information of the message (container structure update information Msg.1). For example, the "MessageID" is an integer that is incremented by 1 whenever a message is generated. "Difference update information" is difference update information of the above described directory structure corresponding to a change of the container hierarchy structure.

Figure 12:
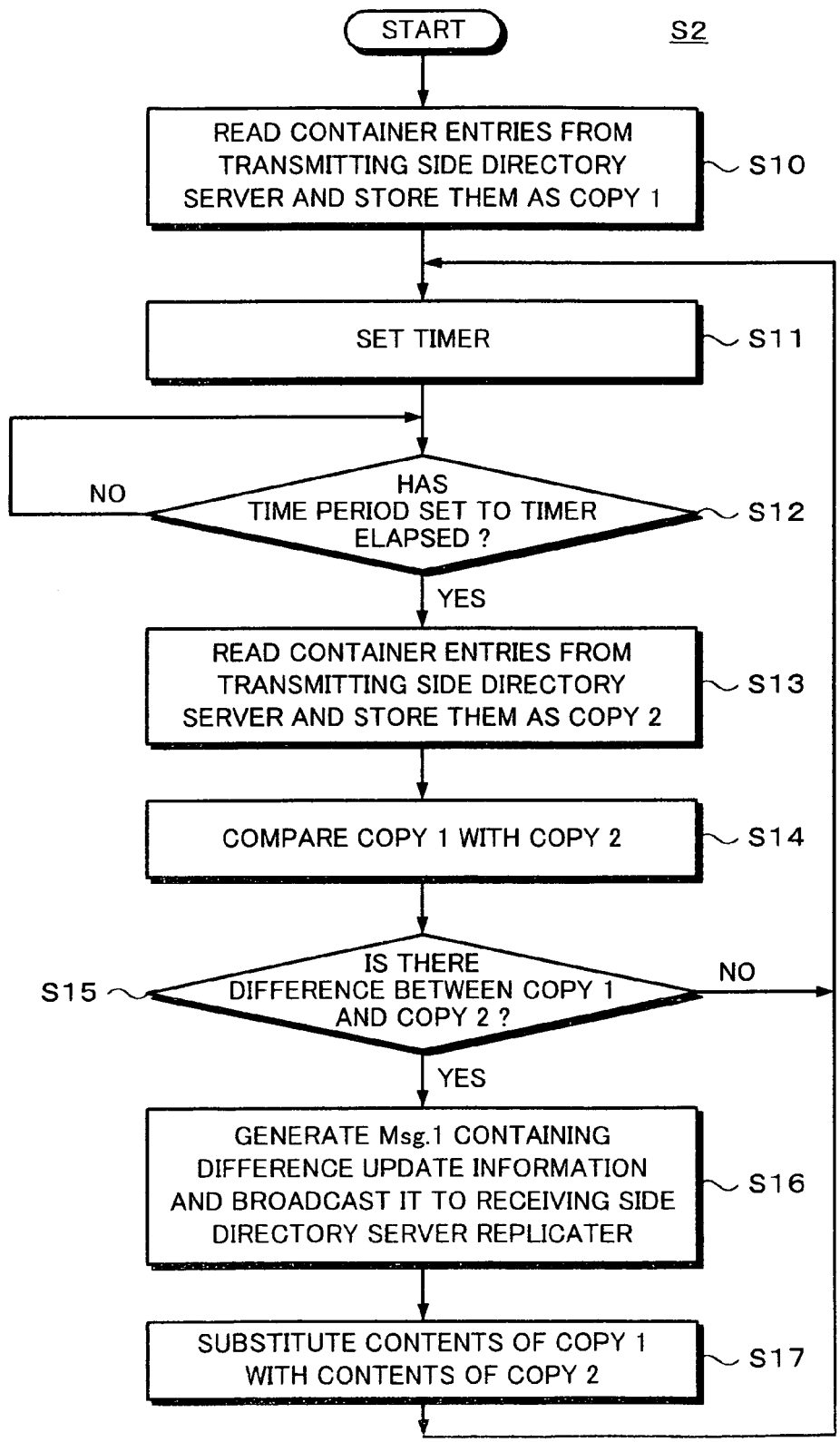
FIG. 12 is a flow chart for explaining a synchronization managing method of container entries in detail.

Next, with reference to a flow chart shown in FIG. 12, the process performed at step S2 of the flow chart shown in FIG. 11 will be described in detail. All the process shown in FIG. 12 is performed by the transmitting side replicater 12. At step S10, all the information of the hierarchical structure of container entries of the transmitting side server 11 is read. The information of the hierarchical structure of the container entries that are read from the transmitting side server 11 is stored as a copy 1 to the storing medium or the recording medium such as a memory or a hard disk of the transmitting side replicater 12.

After the copy 1 has been stored, the flow advances to step S11. At step S11, the timer is set to a predetermined time period and then started. Thereafter, the flow advances to step S12. At step S12, it is determined whether or not the predetermined time period that had been set to the timer has elapsed. When the determined result at step S12 is Yes (namely, the predetermined time period has elapsed), the flow advances to step S13. At step S13, all the information of the hierarchical structure of the container entries of the transmitting side server 11 is read. The hierarchical structure of the container entries that have been read from the transmitting side server 11 is stored as a copy 2 to the storing medium or the recording medium such as a memory or a hard disk of the transmitting side replicater 12.

Thereafter, the flow advances to step S14. At step S14, the copy 1 stored at step S10 is compared with the copy 2 stored at step S13. Thereafter, the flow advances to step S15. At step S15, it is determined whether or not there is a difference between the copy 1 and the copy 2. When the determined result at step S15 is No (namely, there is no difference between the copy 1 and the copy 2), the flow returns to step S11. At step S11, the timer is re-started and the copy 2 is stored.

On the other hand, when the determined result at step S15 is Yes (namely, there is a difference between the copy 1 and the copy 2), the flow advances to step S16. At step S16, corresponding to the difference between the copy 1 and the copy 2, difference update information is generated. In addition, container structure update information Msg.1 containing the difference update information is generated. The generated container structure update information Msg.1 is transmitted and broadcast through the broadcasting network 2. The container structure update information Msg.1 that has been broadcast is received by the receiving side replicater 17.

After the container structure update information Msg.1 has been broadcast at step S16, the flow advances to step S17. At step S17, the contents of the copy 1 are substituted with the contents of the copy 2. Thereafter, the flow returns to step S11.

Figure 13:
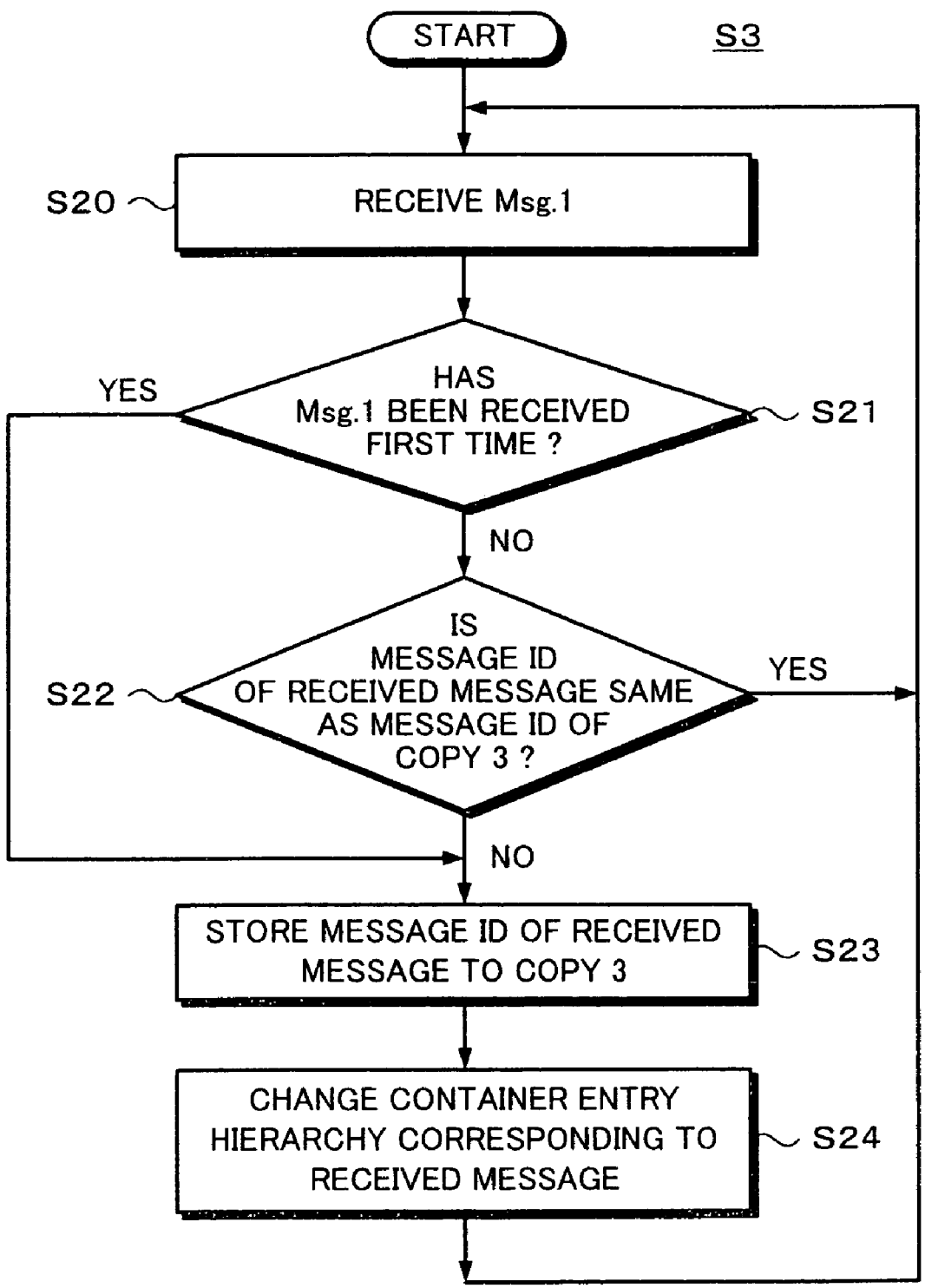
FIG. 13 is a flow chart for explaining the synchronization managing method of the container entries in detail.

Next, with reference to a flow chart shown in FIG. 13, the process performed at step S3 of the flow chart shown in FIG. 11 will be described in detail. All the process of the flow chart shown in FIG. 13 is performed by the receiving side replicater 17. At step S20, the container structure update information Msg.1 that has been transmitted by the transmitting side replicater 12 through the broadcasting network 2 is received by the receiving side replicater 17.

At step S21, it is determined whether or not the container structure update information Msg.1 has been received first time at step S20. When the determined result at step S21 is Yes (namely, the container structure update information Msg.1 has been received first time), the flow advances to step S23. At step S23, the message ID contained in the container structure update information Msg.1 is stored as a copy 3 to the storing medium or the recording medium such as a memory or a hard disk of the receiving side replicater 17.

Thereafter, the flow advances to step S24. At step S24, corresponding to the contents of the received container structure update information Msg.1 (namely, the difference update information contained in the container structure update information Msg.1), the directory information managed by the receiving side server 16 is updated. The structure of the container hierarchy represented by the directory information is changed. Thereafter, the flow returns to step S20.

On the other hand, when the determined result at step S21 is No (namely, the container structure update information Msg.1 has been received at step S20 not first time), the flow advances to step S22. At step S22, it is determined whether or not the message ID contained in the received container structure update information Msg.1 is the same as the message ID stored as the copy 3 at step S23. When the determined result at step S22 is Yes (namely, they are the same), the flow returns to step S20.

On the other hand, when the determined result at step S22 is No (namely, they are not the same), the flow advances to step S23. At step S23, as was described above, the message ID is stored as the copy 3 to the storing medium. In this case, the message ID that has been received and stored is substituted with the message ID that has been newly received. Thereafter, the flow advances to step S24. At step S24, corresponding to the received container structure update information Msg.1, the contents of the container entry hierarchy of the receiving side server 16 are changed.

Next, with reference to a flow chart shown in FIG. 14, a method for managing the synchronization of leaf entries will be described. At step S30, the transmitting side client 10 changes a leaf entry in the immediately lower hierarchical level of a particular container entry of a directory structure managed by the transmitting side server 11. For example, the transmitting side client 10 performs a process for adding a new leaf entry to the immediately lower hierarchical level of a particular container entry, a process for deleting a leaf entry from the immediately lower hierarchical level of a particular container entry, or a process for modifying a leaf entry of the immediately lower hierarchical level of a particular container entry.

At step S31, the transmitting side replicater 12 detects a change of a leaf entry in the immediately lower hierarchical level of a particular container entry of the transmitting side server 11.

Corresponding to the detected result, leaf update information Msg.x1 due to the change of the leaf entry in the immediately lower hierarchical level of the particular container entry is generated. The generated leaf update information Msg.x1 is cyclically broadcast to a plurality of receiving side replicaters 17 through the broadcasting network 2.

At step S32, the leaf update information Msg.x1 that has been broadcast is received by the receiving side replicaters 17. Each receiving side replicater 17 changes a relevant leaf entry managed with the directory information stored in the receiving side server 16 corresponding to the received leaf update information Msg.x1. Thus, a leaf entry of the directory information on the transmitting side 1 is synchronized with a leaf entry of the directory information on the receiving side 3.

The format of the leaf update information Msg.x1 is expressed as follows.

Leaf Entry Update Message {
MessageID,
Difference update information
}

"MessageID" (Message ID) is identification information of the message (leaf update information Msg.x1). For example, the "MessageID" is an integer that is incremented by 1 whenever a message is generated. "Difference update information" is difference update information of the above-described directory structure.

Next, with reference to a flow chart shown in FIG. 15, the process performed at step S31 of the flow chart shown in FIG. 14 will be described in detail. All the process of the flow chart shown in FIG. 15 is performed by the transmitting side replicater 12. At step S40, all leaf entry names in the immediately lower hierarchical level of a particular container entry of the transmitting side server 11 are read. The leaf entry names that are read from the transmitting side server 11 are stored as a copy 4 to the storing medium or the recording medium such as a memory or a hard disk of the transmitting side replicater 12.

After the copy 4 has been stored, the flow advances to step S41. At step S41, the timer is set to a predetermined time period and then started. Thereafter, the flow advances to step S42. At step S42, it is determined whether or not the predetermined time period that had been set to the timer has elapsed. When the determined result at step S42 is Yes (namely, the predetermined time period has elapsed), the flow advances to step S43. At step S43, all leaf entry names in the lower hierarchical level of the particular container entry of the transmitting side server 11 are read. The leaf entry names that have been read from the transmitting side server 11 are stored as a copy 5 to the storing medium or the recording medium such as a memory or a hard disk of the transmitting side replicater 12.

Thereafter, the flow advances to step S44. At step S44, the copy 4 stored at step S40 is compared with the copy 5 stored at step S43. Thereafter, the flow advances to step S45. At step S45, it is determined whether or not there is a difference between the copy 4 and the copy 5. When the determined result at step S45 is No (namely, there is no difference between the copy 4 and the copy 5), the flow returns to step S41. At step S41, the timer is restarted and the copy 5 is stored.

On the other hand, when the determined result at step S45 is Yes (namely, there is a difference between the copy 4 and the copy 5), the flow advances to step S46. At step S46, corresponding to the difference between the copy 4 and the copy 5, difference update information is generated. In addition, leaf update information Msg.x1 that contains the difference update information is generated. The generated leaf update information Msg.x1 is transmitted and broadcast through the broadcasting network 2. The leaf update information Msg.x1 that has been broadcast is received by a plurality of receiving side replicaters 17.

After the leaf update information Msg.x1 has been broadcast at step S46, the flow advances to step S47. At step S47, the contents of the copy 4 are substituted with the contents of the copy 5. Thereafter, the flow returns to step S41.

The process of the flow chart shown in FIG. 15 is performed by the transmitting side replicater 12 for all container entries of the directory structure managed by the transmitting side server 11.

Figure 16:
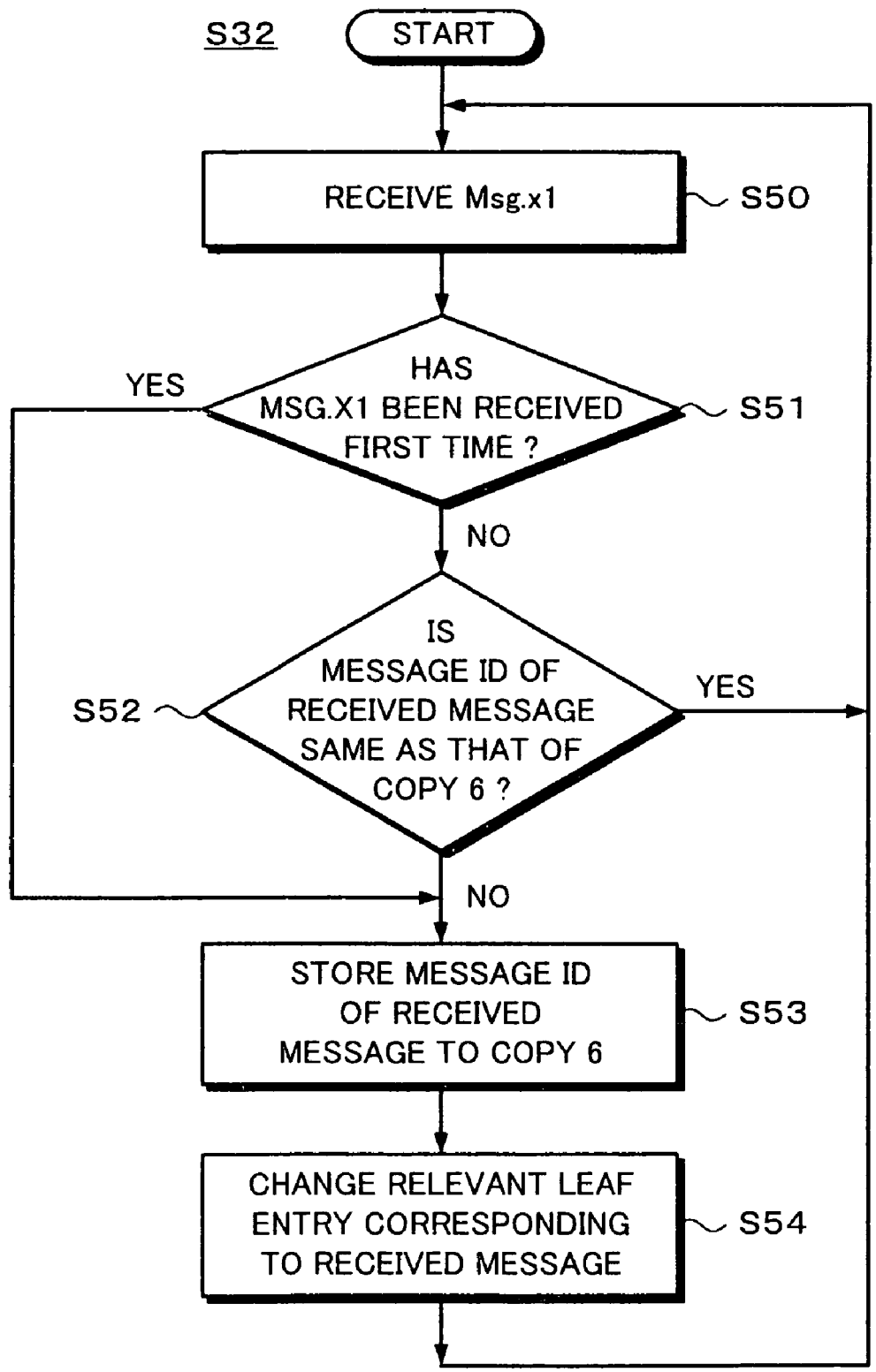
FIG. 16 is a flow chart for explaining the synchronization managing method of the leaf entries in detail.

Next, the process of step S32 of the flow chart shown in FIG. 14 will be described in detail with reference to a flow chart shown in FIG. 16. All the process of the flow chart shown in FIG. 16 is performed by the receiving side replicater 17. At step S50, leaf update information Msg.x1 that has been broadcast by the transmitting side replicater 12 through the broadcasting network 2 is received by the receiving side replicater 17.

At step S51, it is determined whether or not the leaf update information Msg.x1 has been received at step S50 first time. When the determined result at step S51 is Yes (namely, the leaf update information Msg.x1 has been received first time), the flow advances to step S53. At step S53, the message ID of the received leaf update information Msg.x1 is stored as a copy 6 to the recording medium or the storing medium such as a memory or a hard disk of the receiving side replicater 17.

Thereafter, the flow advances to step S54. At step S54, corresponding to the contents of the received leaf update information Msg.x1 (namely, the difference update information contained in the leaf update information Msg.x1), a relevant leaf entry of the directory information managed by the receiving side server 16 is changed. Thereafter, the flow returns to step S50.

On the other hand, when the determined result at step S51 is No (namely, the leaf update information Msg.x1 has been received not first time), the flow advances to step S52. At step S52, it is determined whether or not the message ID contained in the received leaf update information Msg.x1 is the same as the message ID stored as the copy 6 at step S53. When the determined result at step S52 is Yes (namely, they are the same), the flow returns to step S50.

On the other hand, when the determined result at step S52 is No (namely, they are not the same), the flow advances to step S53. At step S53, as was described above, the message ID is stored as a copy 6 to the storing medium. In this case, the message ID that has been received and stored is overwritten with the message ID that has been newly received. Thereafter, the flow advances to step S54. At step S54, corresponding to the received leaf update information Msg.x1, a relevant left entry of the receiving side server 16 is changed.

Figure 14:
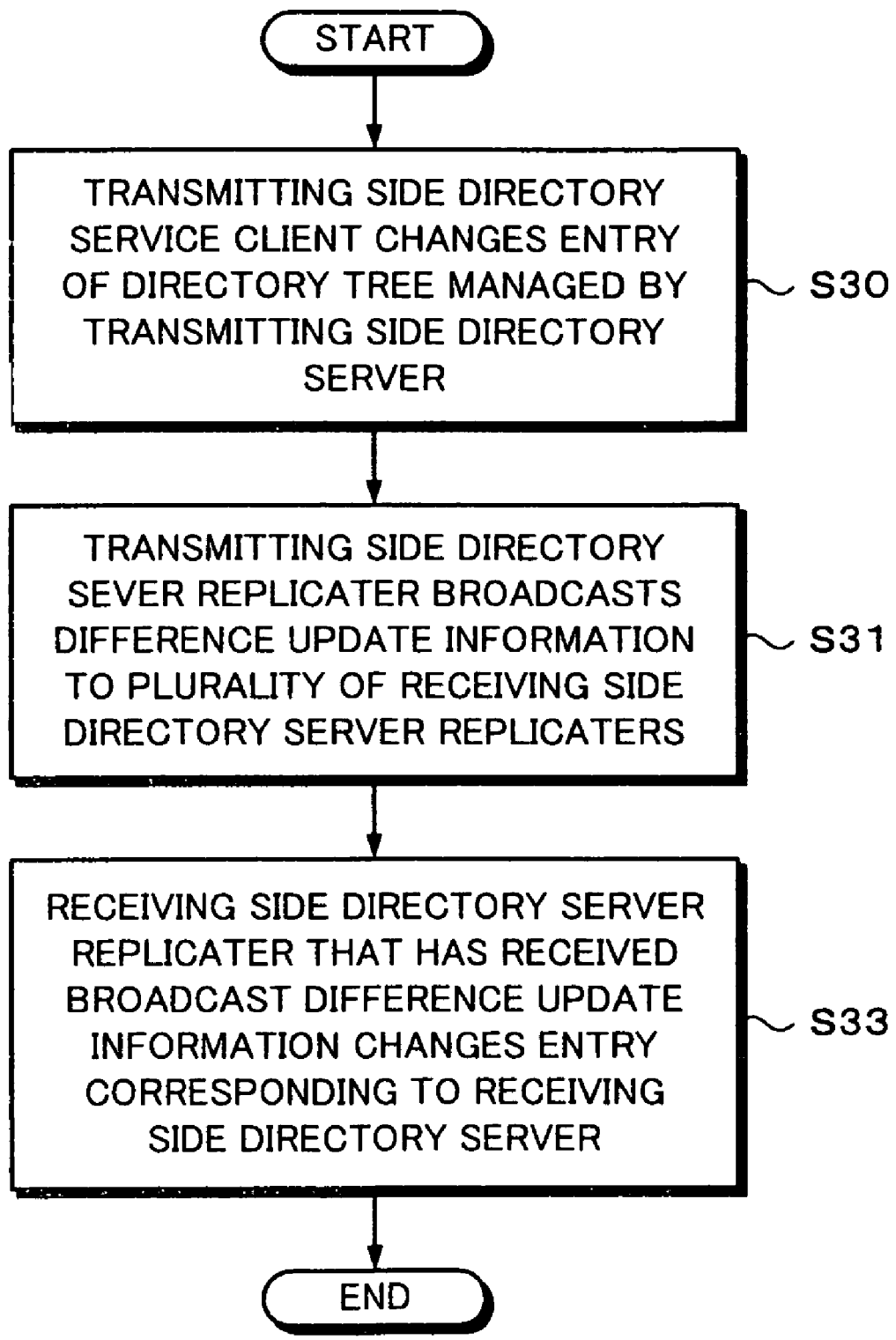
FIG. 14 is a flow chart for explaining the synchronization managing method of leaf entries.
Figure 15:
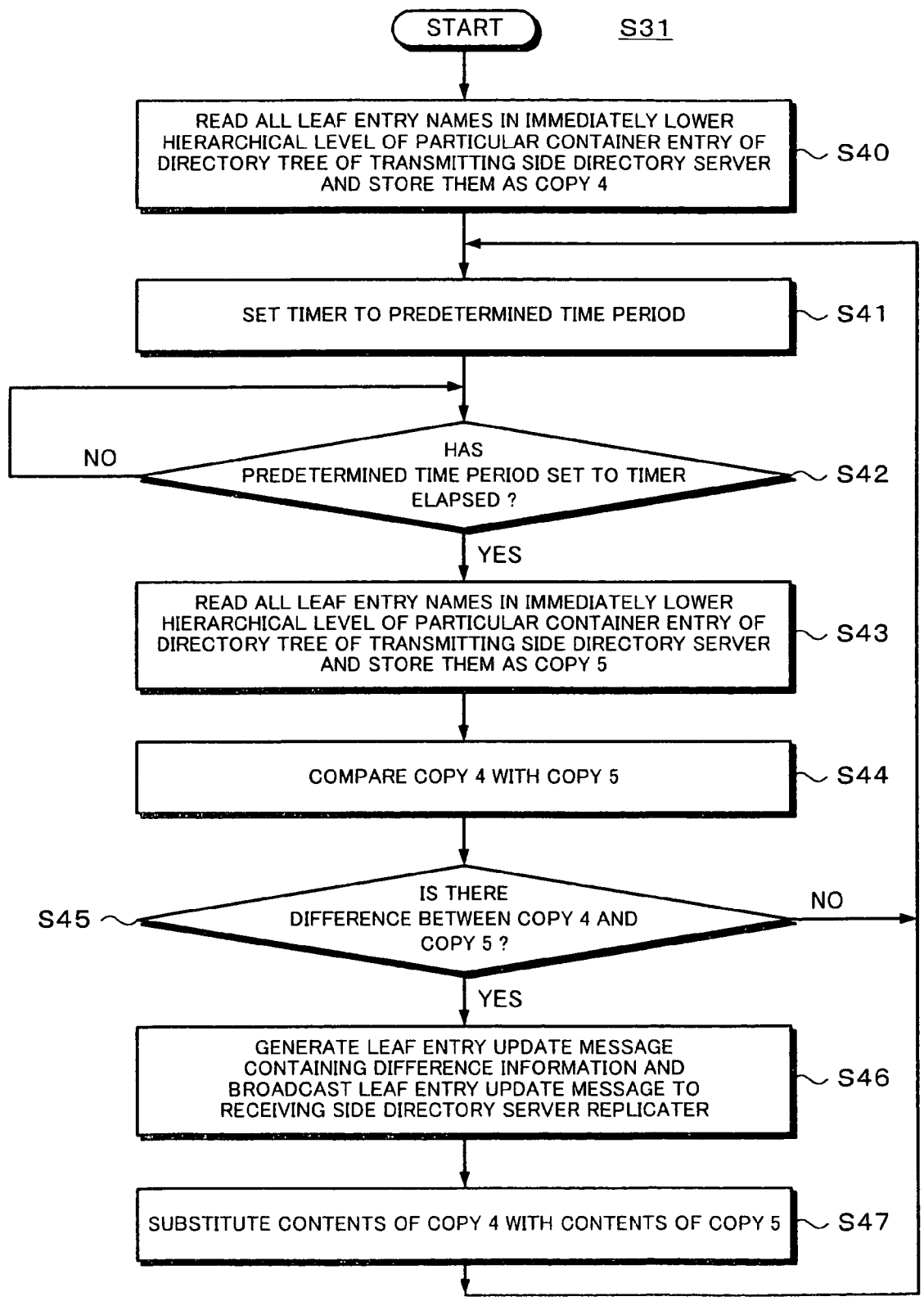
FIG. 15 is a flow chart for explaining a synchronization managing method of the leaf entries in detail.

At step S31 of the flow chart shown in FIG. 14, the leaf update information Msg.x1 for all the container entries of the directory structure managed by the transmitting side 1 is broadcast. Thus, it is supposed that the data amount of the leaf update information Msg.x1 is huge. Thus, as was described as a problem mentioned in the section of the related art reference, when the receiving side 3 receives all the leaf update information Msg.x1 and performs the process shown in FIG. 16 for it, the receiving side 3 is adversely loaded. To prevent that, the receiving side 3 should effectively filter only the leaf update information Msg.x1 of leaf entries in the immediately lower hierarchical level of container entries that are frequently inquired from that for all the container entries that have been broadcast.

For example, it is assumed that the receiving side replicater 17 is used along with for example a set top box (STB) that is connected to a television receiver or the like and that has a limited processing capability and storing capacity (in other words, the receiving side replicater 17 is used in an environment of an insufficient computer resource). In this case, the receiving data amount of the leaf update information Msg.x1 that is broadcast is limited. Thus, it is necessary to select the received leaf update information Msg.x1 and supply the selected data to the receiving side replicater 17 so as to reduce the storage cost and the message processing cost. In other words, the cost for storing and processing unnecessary data should be reduced. In particular, as the directory service is becoming common and the directory structure managed by the transmitting side server 11 is becoming huge, the selecting process for the leaf update information Msg.x1 is becoming important.

Next, the filtering process for the leaf update information Msg.x1 will be described. In addition, an effective filtering method according to the present invention will be described. The transmitting side replicater 12 adds a filtering mask to leaf update information Msg.x1 to be broadcast. With the filtering mask, the receiving side replicater 17 performs a filtering process. A mask schema structure for interpreting a filtering mask and a method for causing the transmitting side replicater 12 to notify the receiving side replicater 17 of a mask schema structure will be described later.

The structure of a message (Msg.x1') of which a filtering mask has been added to leaf update information Msg.x1 is defined as follows. The above-described leaf update information Msg.x1 is substituted with the leaf update information Msg.x1'. In other words, the leaf update information Msg.x1' is defined as follows:

Leaf Entry Update Message {
MessageID,
FilteringMask,
Difference update information
}

As with the above-described leaf update information Msg.x1, "MessageID" is an integer as identification information of the message (leaf update information Msg.x1'). For example, whenever a message is generated, the "MessageID" is incremented by 1. "Difference update information" is information that represents a process such as addition, deletion, or attribute change of a leaf entry in the immediately lower hierarchical level of a container entry designated by the filtering mask.

The structure of "FilteringMask" (filtering mask) is defined as follows.

FilteringMask {
MaskSchema Version,
Mask Value
}

"MaskSchema Version" is equivalent to a message ID of the above-described container structure update information Msg.1. Whenever a filtering mask is generated, the "MaskSchema Version" is incremented by 1. "Mask Value" is the value of a mask represented as for example a bit string or on the order of bytes.

The structure of the mask value is defined by a mask schema corresponding to a mask schema version. The mask schema will be described later. The transmitting side replicater 12 notifies the receiving side replicater 17 of the mask schema with another message that will be described later.

Next, the method for assigning a mask value will be described. According to the embodiment, each of container entries in the immediately lower hierarchical level of a particular container entry is identified with a bit string composed of a predetermined number of bits. With reference to a mask value contained in the received leaf update information Msg.x1', the receiving side replicater 17 performs a filtering process so as to selectively extract desired leaf update information Msg.x1'.

Figure 17A:
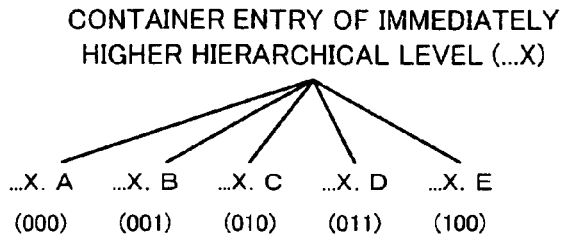
FIGS. 17A, 17B, 17C, and 17D are schematic diagrams for explaining a bit arrangement structure of mask values of filtering masks.

The bit array structure of the mask value of a filtering mask is designated corresponding to the hierarchical structure of container entries. For example, as shown in FIG. 17A, corresponding to the assigning method for entry names described with reference to FIG. 3, to identify entries X.A, X.B, X.C, X.D, and X.E in the immediately lower hierarchical level of a particular container entry X, three-bit mask values (000), (001), (010), (011), and (100) are assigned. In FIGS. 17A to 17D, " . . . " represents that there is a container entry in the immediately higher hierarchical level of the current entry.

Figure 18:
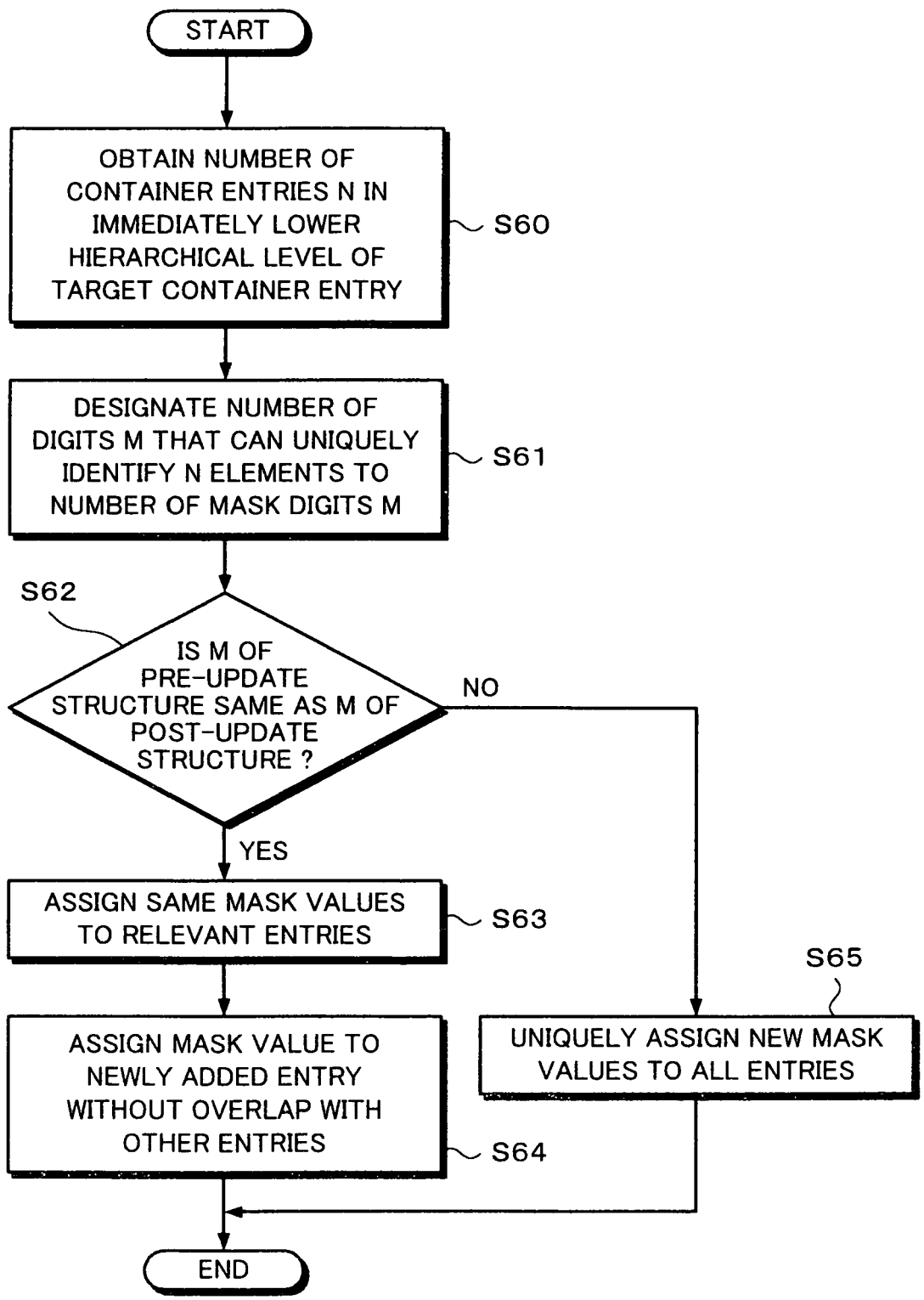
FIG. 18 is a flow chart showing a mask value assigning process corresponding to the increase/decrease of a container entry in the case that an entry is added or deleted.

When an entry is added or deleted to/from a container entry in the immediately lower hierarchical level of a container entry X, a process of a flow chart shown in FIG. 18 is performed. A mask value is assigned corresponding to an addition or a deletion of a container entry. In the following description, a container hierarchy in the state before a container entry is added or deleted is referred to as pre-update container hierarchy. In this example, it is assumed that the number of mask digits M' of the pre-update container hierarchy has been stored in for example the memory of the transmitting side replicater 12.

At step S60, the transmitting side replicater 12 obtains the number of container entries N in the immediately lower hierarchical level of a target container entry. With reference to the list of the container entries in the immediately lower hierarchical level of the target container entry, the number of container entries N is obtained. Thereafter, the flow advances to step S61. At step S61, the number of bits M that can uniquely identify N elements is selected. Thus, the number of mask digits is designated to M. In the example shown in FIG. 20A, since the container entry X has five container entries in the immediately lower hierarchical level thereof, [3] bits that can uniquely identify the five container entries are designated as the number of mask digits.

Thereafter, the flow advances to step S62. At step S62, it is determined whether or not the number of bits M designated at step S61 is the same as the number of mask digits M' designated to the pre-update container hierarchy. When the determined result at step S62 is Yes (namely, the number of mask digits M is the same as the number of mask digits M'), the flow advances to step S63.

At step S63, container entries of the post-update container hierarchy corresponding to those of the pre-update container hierarchy are designated the same mask value. Thereafter, the flow advances to step S64. At step S64, when there is a container entry of the pre-update container hierarchy that does not correspond to that of the post-update container hierarchy, the container entry is assigned a unique mask value that is not used for mask values of the other container entries of the same container hierarchy.

On the other hand, when the determined result at step S62 is No (namely, the number of mask digits M is not the same as the number of mask digits M'), the flow advances to step S65. At step S65, unique mask values are assigned to all the container entries of the container hierarchy.

Figure 17B:
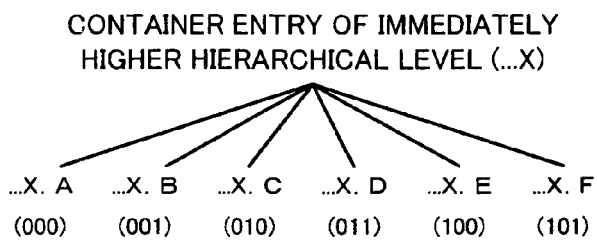

Now, consider that case that a new container entry " . . . X.F" is added to the state shown in FIG. 17A and thereby a container hierarchy shown in FIG. 17B is generated. In this case, since the number of container entries N in the immediately lower hierarchical level of the container entry " . . . X" is 6. To uniquely identify the six container entries, three bits are required. Thus, the number of mask digits M of the container hierarchy in the immediately lower hierarchical level of the post-update container entry " . . . X" is M=3. Since the number of mask digits M' of the pre-update container hierarchy is M'=3, the number of mask digits M' is the same as the number of mask digits M. Thus, mask values of entries of the pre-update container hierarchy are assigned to the container entries " . . . X.A", " . . . X.B", " . . . X.C", " . . . X.D", and " . . . X.E" shown in FIG. 17B (at step S63). On the other hand, the container entry " . . . X.F" that has been newly added is designated a unique mask value (101) that is different from other mask values of the other container entries of the same container hierarchy (at step S64).

Figure 17C:
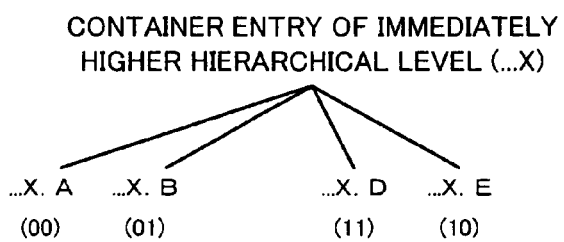

Next, consider the case that the container entry " . . . X.C" is deleted from the state shown in FIG. 17A and thereby a container hierarchy shown in FIG. 17C is generated. In this case, the number of container entries N in the immediately lower hierarchical level of the container entry " . . . X" is N=4. Thus, with two bits as the number of mask digits M, these container entries can be uniquely identified. Consequently, the number of mask digits M of the post-update container hierarchy is M=2. On the other hand, the number of mask digits M' of the pre-update container hierarchy is M'=3. Thus, the number of mask digits M' of the pre-update container hierarchy is not the same as the number of mask digits M of the post-update container hierarchy. In this case, the flow advances to step S65. At step S65, all the entries of the hierarchy are assigned new mask values with the number of mask digits M=2.

Figure 17D:
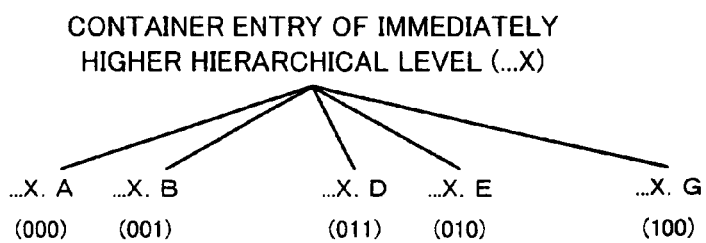

Next, consider that case that a new container entry " . . . X.G" is added to the state shown in FIG. 17C and thereby a state shown in FIG. 17D is generated. In this case, the number of container entries N in the immediately lower hierarchical level of the container entry " . . . X" is N=5. To uniquely identify these container entries, the number of mask digits should be M=3. However, the number of mask digits M of the post-update container hierarchy is not the same as the number of mask digits M' of the pre-update container hierarchy. Thus, in this case, new mask values are assigned to all the container entries in the immediately lower hierarchical level of the container entry " . . . X" at step S65.

Mask values are bit-assigned from the highest hierarchical level of the directory structure. On the other hand, according to the embodiment of the present invention, as was described above, the number of mask digits depends on the number of entries of the same hierarchical level. In addition, when an entry is deleted or added, the number of entries of the container hierarchy changes. Thus, the number of mask digits changes. Consequently, an information mechanism for determining the relation between bits of the bit string that represent mask values and container entries (or container hierarchy) and for interpreting mask values is required.

According to the embodiment of the present invention, a mask schema (MaskSchema) is defined as follows:
MaskSchema {
MaskSchema Version,
TotalMaskLength,
Set of ContainerEntryMaskSchema
}

"MaskSchema Version" (mask schema version) is equivalent to the message ID of the above-described container structure update information Msg.1. Whenever a filtering mask is generated, the "MaskSchema Version" is incremented by 1. "TotalMaskLength" (total mask length) represents the total bit length of all mask values of the overall container hierarchy. In other words, the total mask length corresponds to the number of bits required to represent all hierarchical levels of the directory structure. "Set of ContainerEntryMaskSchema" (set of container entry mask schema) represents an array of "ContainerEntryMaskSchema" (container entry mask schema) that will be described later.

The above-described container entry schema defines a filtering mask corresponding to a particular container entry. In other words, the container entry mask schema is defined as follows:
ContainerEntryMaskSchema {
ContainerEntryName,
OffsetLength,
MaskLength,
AssignedMaskValue
}

"ContainerEntryName" (container entry name) is a character string that represents the entry name of a target container entry. "OffsetLength" (offset length) is an offset value from the first bit of all mask values of a filtering mask of the container entry. "MaskLength" (mask length) represents the number of digits (bit length) of a mask value. "AssignedMaskValue" (assigned mask value) is a mask value as a bit string assigned to an object container entry.

Figure 19A:
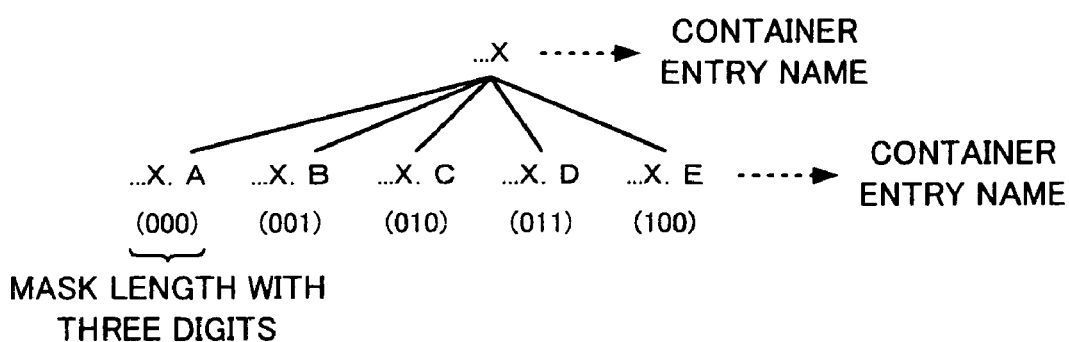
FIGS. 19A and 19B are schematic diagrams for explaining a container entry mask scheme that is coded.

Next, with reference to FIGS. 19A and 19B, a container entry mask schema that is coded will be described. FIG. 19A corresponds to FIG. 17A. Referring to FIG. 19A, there are five container entries " . . . X.A", " . . . X.B", " . . . X.C", " . . . X.D", and " . . . X.E" in the immediately lower hierarchical level of a particular container entry " . . . X". Mask values with a mask length of three digits are assigned to the five container entries. In this example, it is assumed that these five container entries do not have other entries in the immediately lower hierarchical level thereof.

Figure 19B:
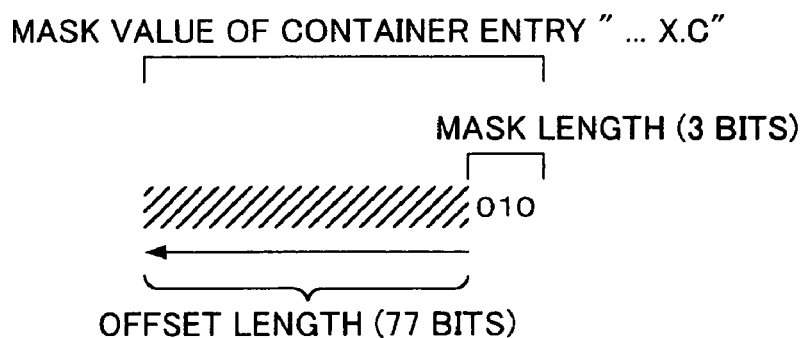

FIG. 19B shows an example of the mask value of a container entry " . . . X.C". In this example, since the offset length is 77 bits, it is clear that the mask value assigned to the container entry " . . . X.C" with a mask length of three bits is three bits starting from 78-th bit of the mask value the container entry " . . . X.C". The mask value of the 77 bits contained in the offset length is an assigned mask value corresponding to a container entry in the immediately upper hierarchical level of the container entry " . . . X.C".

In such a manner, the position of a mask value assigned to a target container entry is defined and a container entry mask schema is coded.

Next, a more practical example of a container entry mask schema will be described. A container entry mask schema corresponding to the above-described container entry " . . . X.C" is defined as follows:
ContainerEntryMaskSchema {
" . . . X.C", (ContainerEntryName)
77, (OffsetLength)
3, (MaskLength)
010 (AssignedMaskValue)
}

Characters in parentheses are just for comments and omissible.

A container entry schema corresponding to the container entry " . . . X.D" shown in FIG. 19A is for example defined as follows:
ContainerEntryMaskSchema {
" . . . X.D",
77,
3,
011
}

Assuming that the mask schema version is 498 and that the total mask length is 134 bits, the mask schema is defined as follows:
MaskSchema {
498, (MaskSchema Version)
134, (TotalMaskLength)
. . .
ContainerEntryMaskSchema {
" . . . X.C",
77,
3,
010
}
ContainerEntryMaskSchema {
" . . . . X.D,
77,
3,
011
}
. . .
}

In the above example, the container entry mask schemas of the container entries " . . . X.C" and " . . . X.D" are contained in a mask schema. In reality, another container entry mask schema is contained in " . . . ". As is clear from this example, a mask schema contains container entry mask schemas of all container entries of one directory structure.

In this example, although the total mask length is 134 bits, the offset value and the mask length of the container entry mask schema of the container entries " . . . X.C" and " . . . X.D" are 77 bits and 3 bits, respectively. Thus, the total bit length is 80 bits. This means that the container entries " . . . X.C" and " . . . X.D" contain lower container hierarchies.

The filtering mask corresponding to the container entry " . . . X.C" of the above-described mask schema is coded as follows:
FilteringMask {
498, (MaskSchema Version)
. . . . . . . . . . . . 010 (Mask Value)
}

Mask values other than "011" are filled with bits of mask values assigned to container entries of other hierarchical levels.

Likewise, the filtering mask corresponding to the container entry " . . . X.D" is coded as follows:
FilteringMask {
498, (MaskSchema Version)
. . . . . . . . . . . . . . 011 (Mask Value)
}

The transmitting side replicater 12 monitors the transmitting side server 11, detects a change of the hierarchical structure of container entries, and changes the above-described mask schema. Thus, when the receiving side 3 properly performs a filtering process, the transmitting side replicater 12 should notify the receiving side replicater 17 of the changed mask schema along with difference update information corresponding to the change of the hierarchical structure.

According to the present invention, to allow the transmitting side replicater 12 to notify the receiving side replicater 17 of the mask schema, the mask schema structure is added to the structure of the above-described container structure update information Msg.1. Container structure update information Msg.1' to which a mask schema structure is added is defined as follows:
Container Structure Update Message
MessageID,
difference update information,
MaskSchema
}

Whenever the structure of the container hierarchy is changed, the mask schema may be changed. Thus, the container structure update information Msg.1' is generated corresponding to a change of the structure of the container hierarchy. "MessageID" (message ID) is an integer that is incremented by 1 whenever the container structure update information Msg.1' is generated. In the following description, the above-described container structure update information Msg.1 is substituted with the container structure update information Msg.1'.

The transmitting side replicater 12 generates leaf update information Msg.x1' that is a message to which a filtering mask corresponding to the container hierarchy has been added at step S46 of the flow chart shown in FIG. 15. The transmitting side replicater 12 broadcasts the generated leaf update information Msg.x1' to the receiving side replicater 17. Before the receiving side replicater 17 performs a filtering process for the leaf update information Msg.x1', the receiving side 3 should have designated of a target portion of the container hierarchy that the receiving side client 15 requires.

According to the embodiment of the present invention, the receiving side replicater 17 generates a target mask list that lists masks for processing a target container hierarchy.

Figures 20A, 20B:
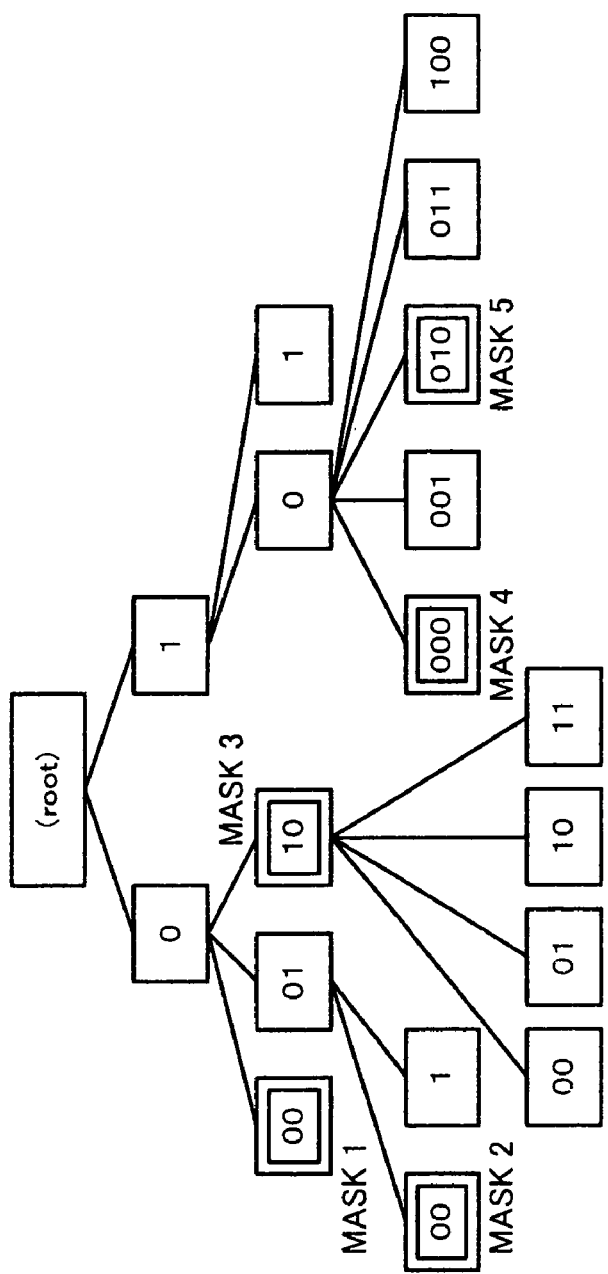
FIGS. 20A and 20B are schematic diagrams for explaining a target mask list.

Next, with reference to FIGS. 20A and 20B, a target mask list will be described. First of all, a directory structure as shown in FIG. 20A is assumed. It is assumed that the directory structure shown in FIG. 20A is composed of only container entries except for a root entry at the highest hierarchical level. In FIG. 20A, a single square represents a container entry, whereas a concentric square represents a container entry that the user designates for the filtering process performed by the receiving side client 15. In FIG. 20A, a numeral in each entry represents a mask value assigned thereto.

As shown in FIG. 20A, container entries designated by the suer are assigned masks 1 to 5 for the filtering process performed by the receiving side client 15. In the directory structure, the mask values of the total mask length of the masks 1, 2, 3, 4, and 5 are "000", "0010", "010", "1000", and "10010", respectively.

FIG. 20B shows an example of a target mask list that lists the designated masks. The target mask list is composed of a schema version that identifies the directory structure and a list of mask values designated by the receiving side client 15. In other words, the target mask list is a list valid for only the directory structure represented by the schema version.

Figure 21:
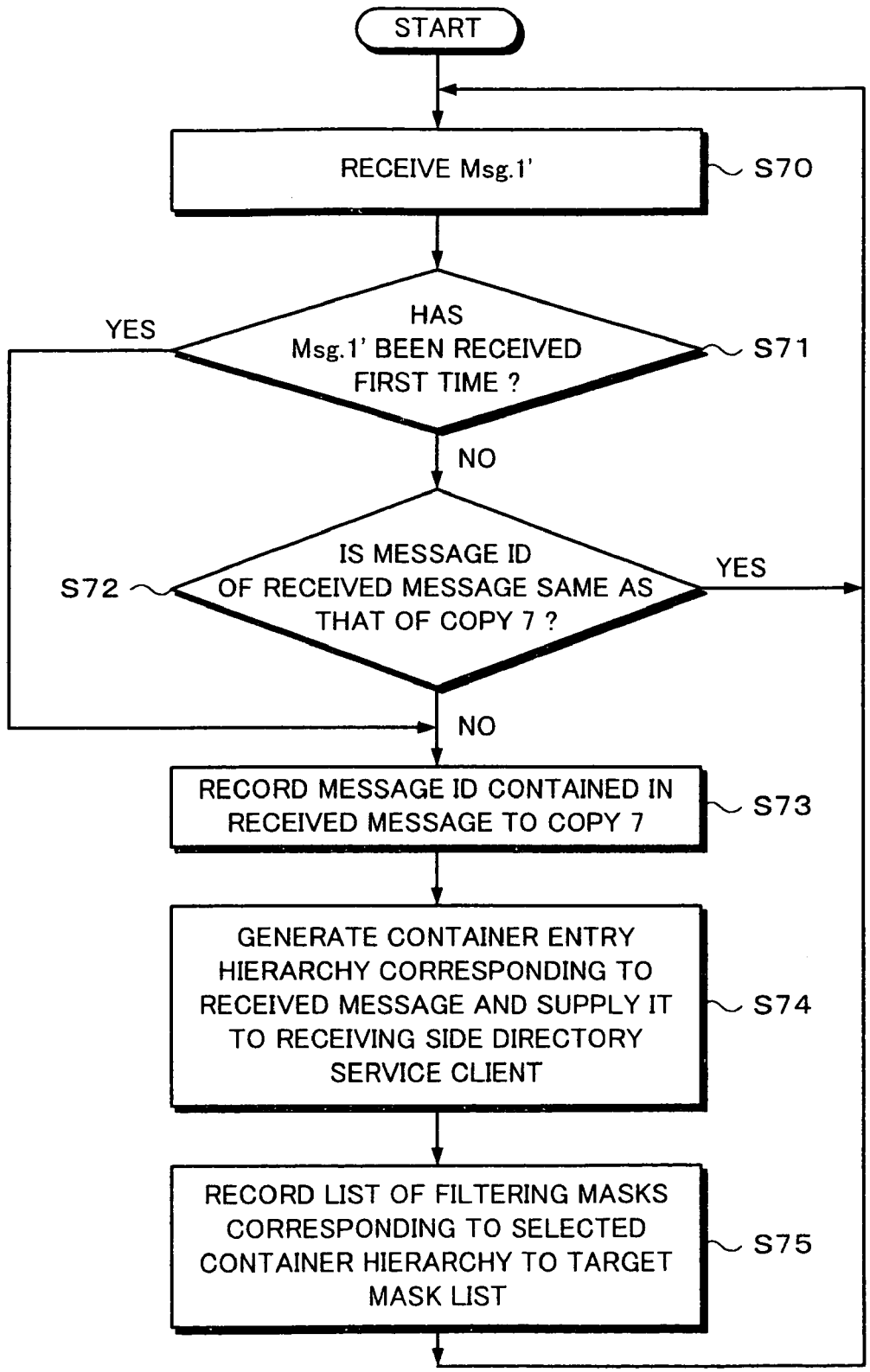
FIG. 21 is a flow chart showing a process for generating a target mask list.

FIG. 21 is a flow chart showing a process for generating a target mask list. This process is executed by the receiving side replicater 17. At step S70, the receiving side replicater 17 receives container structure update information Msg.1'. At step S71, it is determined whether or not the container structure update information Msg.1' has been received first time. When the determined result at step S71 is Yes (namely, the container structure update information Msg.1' has been received first time), the flow advances to step S73.

At step S73, the message ID contained in the received container structure update information Msg.1' is stored as a copy 7 to the storing medium or the recording medium such as a memory or a hard disk of the receiving side replicater 17.

At step S74, corresponding to the contents of the received container structure update information Msg.1', a container hierarchy is generated. The receiving side replicater 17 notifies the receiving side client 15 of information that represents the generated container hierarchy so as to prompt the receiving side client 15 for selecting a container entry to be designated. For example, the receiving side client 15 causes a predetermined displaying means to display information corresponding to the supplied container hierarchy. The user selects a required container entry with reference to the information displayed on the displaying means. The selected container entry information is supplied from the receiving side client 15 to the receiving side replicater 17.

A container entry may be designated by other than the user. In other words, the receiving side client 15 may store container entry information inquired by the user, learn the user's favorites corresponding to the stored information, and automatically select a container entry corresponding to the learnt result. Alternatively, a container entry may be designated in a combination of user's direct selection and automatic selection using such a learning process.

After a container entry has been selected at step S74, the flow advances to step S75. At step S75, a filtering mask corresponding to the selected container hierarchy is designated. A list of the designated filtering masks is stored as a target mask list to the recording medium or the storing medium such as a memory or a hard disk of the receiving side replicater 17.

On the other hand, when the determined result at step S71 is No (namely, the container structure update information Msg.1' has been received not first time), the flow advances to step S72. At step S72, it is determined whether or not the message ID contained in the received container structure update information Msg.1' is the same as the message ID stored as copy 7 in the storing medium at step S73.

When the determined result at step S72 is Yes (namely, they are the same), the flow returns to step S70. On the other hand, when the determined result at step S72 is No (namely, they are not the same), the flow advances to step S74. At step S74, the message ID contained in the newly received container structure update information Msg.1' is stored to the storing medium instead of the old message ID. Corresponding to the container structure update information Msg.1' that has been newly received, the following process is performed.

Figure 22:
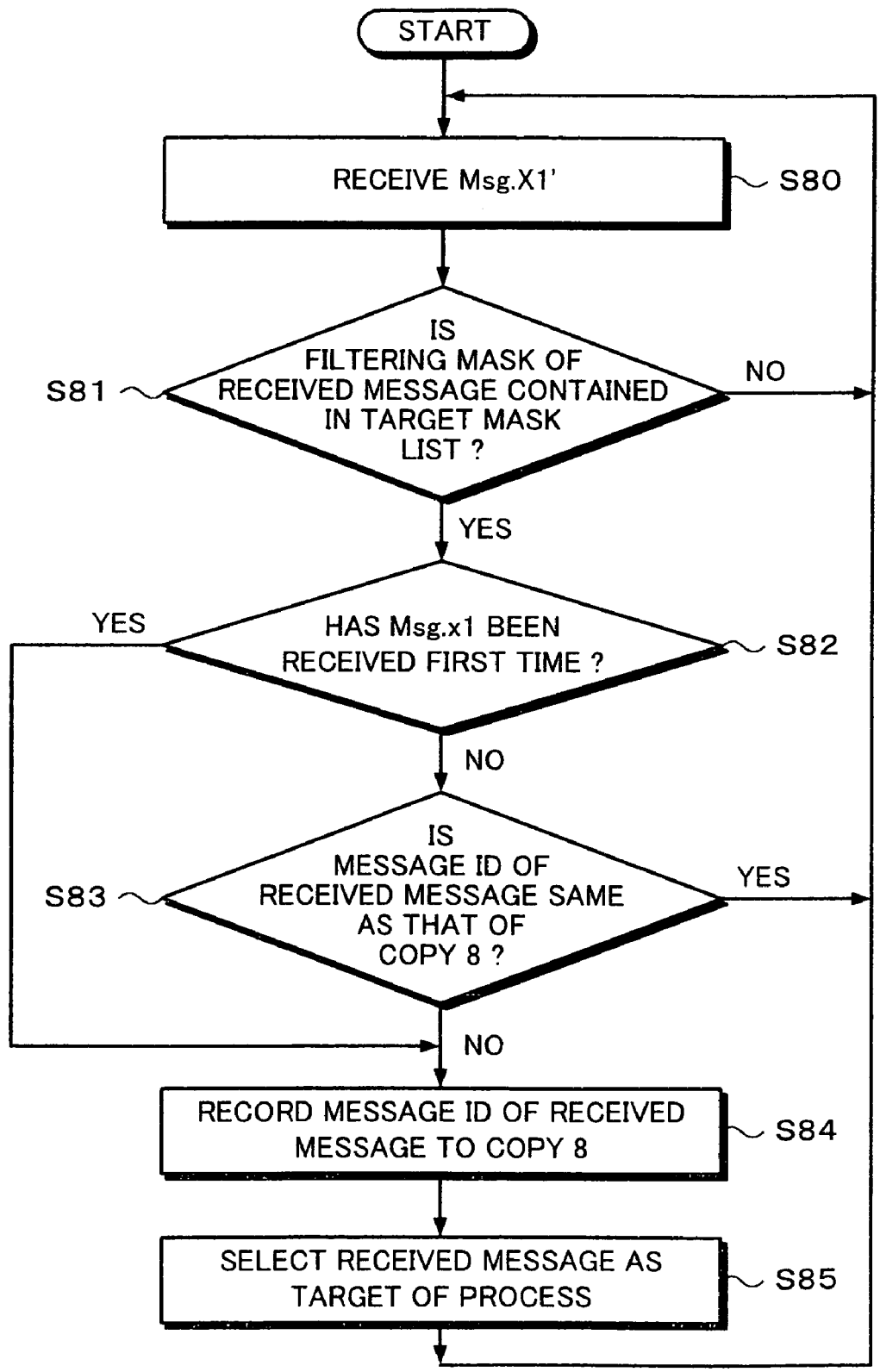
FIG. 22 is a flow chart showing a process for selectively receiving broadcast leaf update information Msg.x1' corresponding to a target mask list.

FIG. 22 is a flow chart showing a process for selectively receiving leaf update information Msg.x1' (that has been broadcast) corresponding to a target mask list generated in the process of the flow chart shown in FIG. 21. The receiving side replicater 17 selectively receives leaf update information Msg.x1' having a filtering mask listed in the target mask list from the leaf update information Msg.x1' that has been broadcast through the broadcasting network 2. Corresponding to the leaf update information Msg.x1' that has been selectively received, the process of step S32 of the flow chart shown in FIG. 14 is executed.

In FIG. 22, at step S80, the receiving side replicater 17 receives leaf update information Msg.x1' that has been broadcast through the broadcasting network 2. The receiving side replicater 17 references the target mask list stored in the storing medium and determines whether or not the filtering mask contained in the received leaf update information Msg.x1' is contained in the target mask list. When the determined result at step S81 is No (namely, the filtering mask is not contained in the target mask list), the flow returns to step S80.

On the other hand, when the determined result at step S81 is Yes (namely, the filtering mask is contained in the target mask list), the flow advances to step S82. At step S82, it is determined whether or not the leaf update information Msg.x1' has been received first time. When the determined result at step S82 is Yes (namely, the leaf update information Msg.x1' has been received first time), the flow advances to step S84. The message ID contained in the received leaf update information Msg.x1' is stored as a copy 8 to the recording medium or the storing medium such as a memory or a hard disk of the receiving side replicater 17. Thereafter, the flow advances to step S85. At step S85, the received leaf update information Msg.x1' is selected as a target of the process of the receiving side replicater 17.

On the other hand, when the determined result at step S82 is No (namely, the leaf update information Msg.x1' has been received not first time), the flow advances to step S83. At step S83, it is determined whether or not the message ID contained in the received leaf update information Msg.x1' is the same as the message ID stored as copy 8 to the storing medium at step S84.

When the determined result at step S83 is Yes (namely, they are the same), the flow returns to step S80. On the other hand, when the determined result at step S83 is No (namely, they are not the same), the flow advances to step S84. At step S84, the message ID contained in the received leaf update information Msg.x1' is stored to the storing medium instead of the old message ID. Corresponding to the newly received leaf update information Msg.x1', the next process is performed.

As described above, only a user's favorite portion of the directory structure managed by the transmitting side server 11 can be stored and updated by the receiving side server 16. Thus, the storing medium that stores the directory structure can be effectively used in the receiving side server 16. In addition, the storage cost of the directory structure in the receiving side server 16 can be suppressed. Moreover, the processing efficiency of the receiving side client 15 corresponding to a search request for contents data stored in the receiving side server 16 can be remarkably improved.

In the above-descried embodiment, the mask length of a mask assigned to each container entry is variable. However, the present invention is not limited to such an example. According to the present invention, the mask length may be a fixed length (for example on the order of bytes).

As was described above, according to the present invention, the directory structure managed by the receiving side server can store and update a portion of the directory structure managed by the transmitting side server corresponding to a user's favorite. Thus, the storing medium and the recording medium that store the directory structure can be effectively used on the receiving side server.

In addition, according to the present invention, the storage cost of the directory structure of the receiving side server can be suppressed.

Moreover, according to the present invention, the process efficiency of the receiving side client for a search request to contents data of the receiving side server can be remarkably improved.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A transmitting apparatus for transmitting a hierarchical structure of a directory for hierarchically managing locations of contents data, comprising:

managing means for managing a hierarchical structure of a directory comprising a plurality of nodes, wherein each of said nodes is at a hierarchical level and comprises a container entry or a leaf entry, each of said container entries including information of nodes at lower hierarchical levels thereof, each leaf entry being located directly below one of the container entries, each leaf entry not including information of nodes at lower hierarchical levels thereof;

detecting means for detecting a change of the hierarchical structure of the directory managed by said managing means, detecting a change tracking value of said hierarchical structure on the basis of the detected change, and obtaining first difference information and second difference information, the first difference information corresponding to the change of the hierarchical structure of container entries, the second difference information corresponding to the change of the hierarchical structure of leaf entries;

generating means for generating first message and second message, the first message including said first difference information and a mask schema for interpreting a filtering mask, the second message including said second difference information and the filtering mask, wherein the filtering mask corresponds to information of one of the leaf entries being directly under one of the container entries; and transmitting means for separately transmitting said first message and said second message.

2. The transmitting apparatus as set forth in claim 1, wherein said filtering mask comprises a value based on number of container entries on the hierarchical level directly above the one leaf entry.

3. The transmitting apparatus as set forth in claim 1, wherein said transmitting means adds identification information that identifies each leaf entry to the second difference information.

4. A transmitting method for transmitting a hierarchical structure of a directory for hierarchically managing locations of contents data, comprising the steps of:
(a) managing a hierarchical structure of a directory comprising a plurality of nodes, wherein each of said nodes is at a hierarchical level and comprises a container entry or a leaf entry, each of said container entries including information of nodes at lower hierarchical levels thereof, each leaf entry being located directly below one of the container entries, each leaf entry not including information of nodes at lower hierarchical levels thereof;
(b) detecting a change of the hierarchical structure of the directory managed at step (a), detecting a change tracking value of said hierarchical structure on the basis of the detected change, and obtaining first difference information and second difference information, the first difference information corresponding to the change of the hierarchical structure of container entries, the second difference information corresponding to the change of the hierarchical structure of leaf entries;
(c) generating first message and second message, the first message including said first difference information and a mask schema for interpreting a filtering mask, the second message including said second difference information and the filtering mask, wherein the filtering mask corresponds to information of one of the leaf entries being directly under one of the container entries; and
(d) separately transmitting said first message and said second message.

5. A receiving apparatus for receiving a hierarchical structure of a directory for hierarchically managing locations of contents data that is transmitted, comprising:
receiving means for receiving first message, first identification information, second message, and second identification information, wherein said first message includes first difference information and said second message includes second difference information, the first difference information being obtained by detecting a change of container entries, the first identification information identifying each container entry added to the first difference information, the second difference information being obtained by detecting a change of leaf entries, the second identification information identifying each leaf entry added to the second difference information, the directory comprising a plurality of nodes, wherein each of said nodes is at a hierarchy level and comprises one of the container entries or one of the leaf entries, each of said container entries including information of nodes at lower hierarchical levels thereof, each leaf entry being located directly below one of the container entries, each leaf entry not including information of nodes at lower hierarchical levels thereof, said receiving means, the first message further including a mask schema for interpreting a filtering mask, the second message further including the filtering, wherein the filtering mask corresponds to information of one of the leaf entries being directly under one of the container entries;
managing means for managing the hierarchical structure of the directory formed corresponding to the first message and the second message; and
changing means for selectively obtaining the second message and changing the hierarchical structure of the directory managed by said managing means corresponding to the obtained second message.

6. The receiving apparatus as set forth in claim 5, wherein said changing means selectively obtains the second message as one of the leaf entries of the lower hierarchical level of a container entry represented by the first identification information corresponding to selection information selectively designated to the first identification information and changes the hierarchical structure of the directory managed by said managing means.

7. A receiving method for receiving a hierarchical structure of a directory for hierarchically managing locations of contents data that is transmitted, comprising the steps of:
(a) receiving first message, first identification information, second message, and second identification information, wherein said first message includes first difference information and said second message includes second difference information, the first difference information being obtained by detecting a change of container entries, the first identification information identifying each container entry added to the first difference information, the second difference information being obtained by detecting a change of leaf entries, the second identification information identifying each leaf entry added to the second difference information, the directory comprising a plurality of nodes, wherein each of said nodes is at a hierarchy level and comprises one of the container entries or one of the leaf entries, each of said container entries including information of nodes at lower hierarchical levels thereof, each leaf entry being located directly below one of the container entries, each leaf entry not including information of nodes at lower hierarchical levels thereof, said receiving means, the first message further including a mask schema for interpreting a filtering mask, the second message further including the filtering mask, wherein the filtering mask corresponds to information of one of the leaf entries being directly under one of the container entries;
(b) managing the hierarchical structure of the directory formed corresponding to the first message and the second message; and
(c) selectively obtaining the second message and changing the hierarchical structure of the directory managed at step (b) corresponding to the obtained second message.

8. A transmitting and receiving system for transmitting a hierarchical structure of a directory for hierarchically managing locations of contents data and receiving the transmitted hierarchical structure, comprising:
first managing means for managing a hierarchical structure of a directory comprising a plurality of nodes, wherein each of said nodes is at a hierarchical level and comprises a container entry or a leaf entry, each of said container entries including information of nodes at lower hierarchical levels thereof, each leaf entry being located directly below one of said container entries, each leaf entry not including information of nodes at lower hierarchical levels thereof;

detecting means for detecting a change of the hierarchical structure of the directory managed by said managing means, detecting a change tracking value of said hierarchical structure on the basis of the detected change, and obtaining first difference information and second difference information, the first difference information corresponding to the change of the hierarchical structure of container entries, the second difference information corresponding to the change of the hierarchical structure of leaf entries;

generating means for generating first message and second message, the first message including said first difference information and a mask schema for interpreting a filtering mask, the second message including said second difference information and the filtering mask wherein the filtering mask corresponds to information of one of the leaf entries being directly under one of the container entries;

transmitting means for adding first identification information to the first difference information and second identification information to the second difference information and separately transmitting said first message and said second message, the first identification information identifying each container entry, the second identification information identifying each leaf entry;

receiving means for receiving the first message, the first identification information, the second message, and the second identification information transmitted by said transmitting means;

second managing means for managing the hierarchical structure of the directory formed corresponding to the first message and the second message; and changing means for selectively obtaining the second message and changing the hierarchical structure of the directory managed by said second managing means corresponding to the obtained second message.

9. The receiving and transmitting system as set forth in claim 8, wherein said changing means selectively obtains the second difference information as a one of the leaf entries of the lower hierarchical level of a container entry represented by the first identification information corresponding to selection information selectively designated to the first identification information and changes the hierarchical structure of the directory managed by said second managing means.

10. A transmitting and receiving method for transmitting a hierarchical structure of a directory for hierarchically managing locations of contents data and receiving the transmitted hierarchical structure, comprising the steps of:

(a) managing a hierarchical structure of a directory comprising a plurality of nodes, wherein each of said nodes is at a hierarchical level and comprises a container entry or a leaf entry, each of said container entries including information of nodes at lower hierarchical levels thereof, each leaf entry being located directly below one of said container entries, each leaf entry not including information of nodes at lower hierarchical levels thereof;

(b) detecting a change of the hierarchical structure of the directory managed at step (a), detecting a change tracking value of said hierarchical structure on the basis of the detected change, and obtaining first difference information and second difference information, the first difference information corresponding to the change of the hierarchical structure of container entries, the second difference information corresponding to the change of the hierarchical structures of leaf entries;

(c) generating first message and second message, the first message including said first difference information and a mask schema for interpreting a filtering mask, the second message including said second difference information and the filtering mask wherein the filtering mask corresponds to information of one of the leaf entries being directly under one of the container entries;

(d) adding first identification information to the first difference information and second identification information to the second difference information and separately transmitting said first message and said second message, the first identification information identifying each container entry, the second identification information identifying each leaf entry;

(e) receiving the first message, the first identification information, the second message, and the second identification information transmitted at step (c);

(f) managing the hierarchical structure of the directory formed corresponding to the first message and the second message; and (g) selectively obtaining the second message and changing the hierarchical structure of the directory managed at step (f) corresponding to the obtained second message.

* * * * *

UNITED STATES PATENT AND TRADEMARK OFFICE
CERTIFICATE OF CORRECTION

PATENT NO. : 7,328,402 B1  
APPLICATION NO. : 09/605461  
DATED : February 5, 2008  
INVENTOR(S) : Yasuaki Yamagishi et al.

It is certified that error appears in the above-identified patent and that said Letters Patent is hereby corrected as shown below:

TITLE PAGE

(73) Assignee: "Sony Corporation, Tokyo (JP);  
Information Broadcasting Laboratores, Inc. , Tokyo (JP)" should be --Sony Corporation, Tokyo (JP);  
Matsushita Electric Industrial Co., Ltd., Osaka, (JP)--

Signed and Sealed this

Eighteenth Day of November, 2008

JON W. DUDAS  
*Director of the United States Patent and Trademark Office*